(12) United States Patent
Yoshino

(10) Patent No.: US 8,957,913 B2
(45) Date of Patent: Feb. 17, 2015

(54) DISPLAY APPARATUS, DISPLAY CONTROL METHOD, AND STORAGE MEDIUM STORING PROGRAM

(71) Applicant: Casio Computer Co., Ltd., Tokyo (JP)

(72) Inventor: Ken Yoshino, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 168 days.

(21) Appl. No.: 13/630,668

(22) Filed: Sep. 28, 2012

(65) Prior Publication Data
US 2013/0083072 A1 Apr. 4, 2013

(30) Foreign Application Priority Data

Sep. 30, 2011 (JP) ................................. 2011-217791

(51) Int. Cl.
G09G 5/00 (2006.01)
G06F 3/01 (2006.01)
H04N 9/31 (2006.01)

(52) U.S. Cl.
CPC .............. *G06F 3/017* (2013.01); *H04N 9/3111* (2013.01)
USPC ......................................... 345/619; 345/649

(58) Field of Classification Search
USPC ........................................................ 345/619
See application file for complete search history.

(56) References Cited

U.S. PATENT DOCUMENTS

| | | | | |
|---|---|---|---|---|
| 7,327,376 B2* | 2/2008 | Shen et al. | .................... | 345/676 |
| 7,701,439 B2* | 4/2010 | Hillis et al. | .................... | 345/156 |
| 8,072,439 B2* | 12/2011 | Hillis et al. | .................... | 345/173 |
| 8,125,459 B2* | 2/2012 | Mattice et al. | ................ | 345/173 |
| 8,624,863 B2* | 1/2014 | Hillis et al. | .................... | 345/173 |
| 8,669,239 B2* | 3/2014 | Hendrix et al. | ............. | 514/44 A |
| 8,669,958 B2* | 3/2014 | Hillis et al. | .................... | 345/173 |
| 8,686,958 B2* | 4/2014 | Rutledge et al. | ............. | 345/173 |
| 2010/0225595 A1* | 9/2010 | Hodges et al. | ................ | 345/173 |
| 2011/0169746 A1 | 7/2011 | Kitajima | | |
| 2011/0169748 A1* | 7/2011 | Tse et al. | ....................... | 345/173 |
| 2011/0175920 A1* | 7/2011 | Ieperen | ......................... | 345/473 |
| 2012/0169618 A1* | 7/2012 | Rutledge et al. | ............. | 345/173 |
| 2013/0021240 A1* | 1/2013 | Coulon | ......................... | 345/156 |

FOREIGN PATENT DOCUMENTS

JP 2009-064109 A 3/2009

* cited by examiner

*Primary Examiner* — M Good Johnson
(74) *Attorney, Agent, or Firm* — Holtz, Holtz, Goodman & Chick PC

(57) ABSTRACT

A display apparatus includes an input unit to input an image signal, a display unit to display an image based on the input image signal, an observer information acquiring unit to acquire the number and positions of observers facing the display object, a display mode determining unit to determine a display mode including a direction of the image to be displayer on the basis of the acquired number and the acquired positions of the observers, and a display control unit to cause the display unit to display an image on the display object in the determined display mode.

20 Claims, 18 Drawing Sheets

DISPLAY APPARATUS, DISPLAY CONTROL METHOD, AND STORAGE MEDIUM STORING PROGRAM

CROSS-REFERENCE TO RELATED APPLICATIONS

This application is based upon and claims the benefit of priority from prior Japanese Patent Application No. 2011-217791, filed Sep. 30, 2011, the entire contents of which are incorporated herein by reference.

BACKGROUND OF THE INVENTION

1. Field of the Invention

The present invention relates to a display apparatus, display control method, and storage medium storing a program, suitable for a projector apparatus or the like of a ceiling-hung type installed in, for example, a conference room or the like.

2. Description of the Related Art

In the projector apparatus to be installed by hanging from the ceiling, in order to enable detection of a user operation on a projected image, a technique is considered in which a hand motion or the like of a user entering the projection screen is detected, and an operation is carried out according to the motion. (for example, Jpn. Pat. Appln. KOKAI Publication No. 2009-064109)

In the technique described in Jpn. Pat. Appln. KOKAI Publication No. 2009-064109 described above, a motion of fingers of a user in a setting image configured to instruct in the projection direction or the like of a projector is detected as an operation signal, and a corresponding display position, display direction or the like is determined.

Accordingly, it is necessary to interrupt projection of the original image or to carry out setting prior to the projection operation and, when the environment such as a position of the user is changed, and the user himself or herself has to change the setting each time, thereby causing an inconvenience in that the usage is complicated.

Under the circumstances, it is desired to provide a display apparatus, display control method, and a storage medium storing a program, capable of realizing a inure viewable (easy-to-see) display state without imposing a useless burden on the user even in a case where a plurality of users are present.

BRIEF SUMMARY OF THE INVENTION

According to one aspect of the present invention, there is provided a display apparatus comprising: an input unit configured to input an image signal; a display unit configured to display an image based on the image signal input by the input unit on a display object; an observer information acquiring unit configured to acquire the number and positions of observers facing the display object; a display mode determining unit configured to determine a display mode including a direction of the image to be displayed by the display unit on the basis of the number and the positions of the observers acquired by the observer information acquiring unit; and a display control unit configured to cause the display unit to display an image on the display object in the display mode determined by the display mode determining unit.

According to another aspect of the present invention, there is provided a display control method for use in an apparatus including an input unit, and a display unit configured to display an image based on an image signal input by the input unit on a display object, the method comprising: performing observer information acquiring processing of acquiring the number and positions of observers facing the display object; performing display mode determining processing of determining a display mode including a direction of the image to be displayed by the display unit on the basis of the number and the positions of the observers acquired in the observer information acquiring processing; and performing display control processing of causing the display unit to display an image on the display object in the display mode determined in the display mode determining processing.

According to still another aspect of the present invention, there is provided a non-transitory computer-readable storage medium having program code stored thereon for controlling a computer in an apparatus including an input unit, and a display unit configured to display an image based on an image signal input by the input unit on a display object, to carry out the functions of: performing observer information acquiring processing of acquiring the number and positions of observers facing the display object; performing display mode determining processing of determining a display mode including a direction of the image to be displayed by the display unit on the basis of the number and the positions of the observers acquired in the observer information acquiring processing; and performing display control processing of causing the display unit to display an image on the display object in the display mode determined in the display mode determining processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment in a case where the present invention is applied to a projector apparatus of a ceiling-mounted type employing the digital light processing (DLP®) system will be described.

Figure 1:
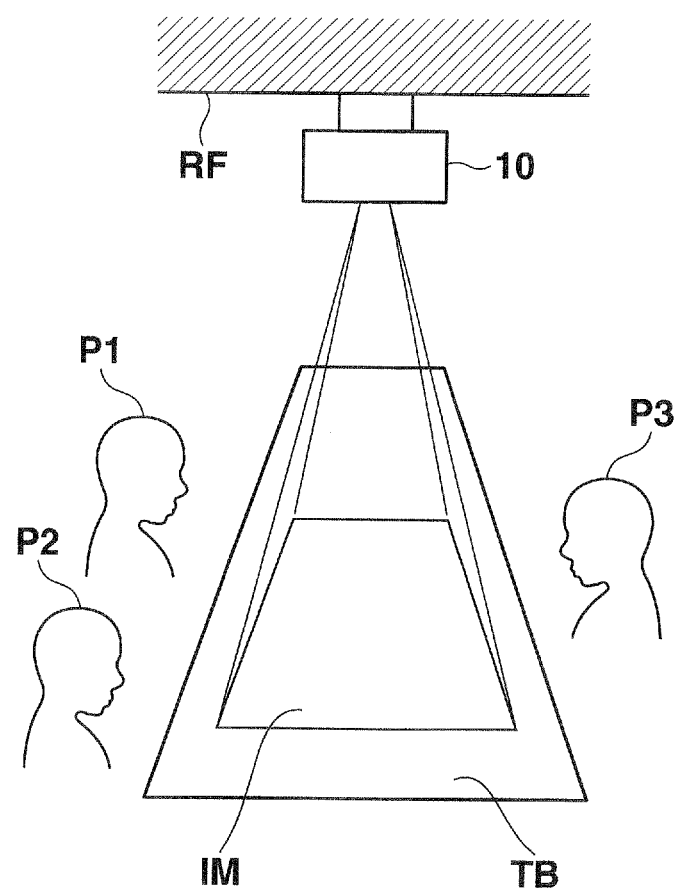
FIG. 1 is a view showing an installation environment of a projector apparatus according to an embodiment of the present invention.

FIG. 1 is a view showing an installation environment of a projector apparatus 10 according to this embodiment.

In FIG. 1, in general, the projector apparatus 10 is fixedly installed on, for example, a ceiling RF of a conference room by using dedicated fittings called ceiling-hanging fittings (ceiling-hanging metal fittings).

The projector apparatus 10 displays an image IM on a surface of a table TB by applying projection light to a table TB which is a projection object arranged directly under the projector apparatus 10.

For example, three observers P1 to P3 sit at the table TB, and observe an image displayed on the surface of the table TB.

It is considered that the projector apparatus 10 according to this embodiment is provided with a zoom lens in a projection lens system to be described later, and is capable of displaying the image IM on the whole surface of the table TB by projection when a projection field angle on the widest-angle side is set.

Figure 2:
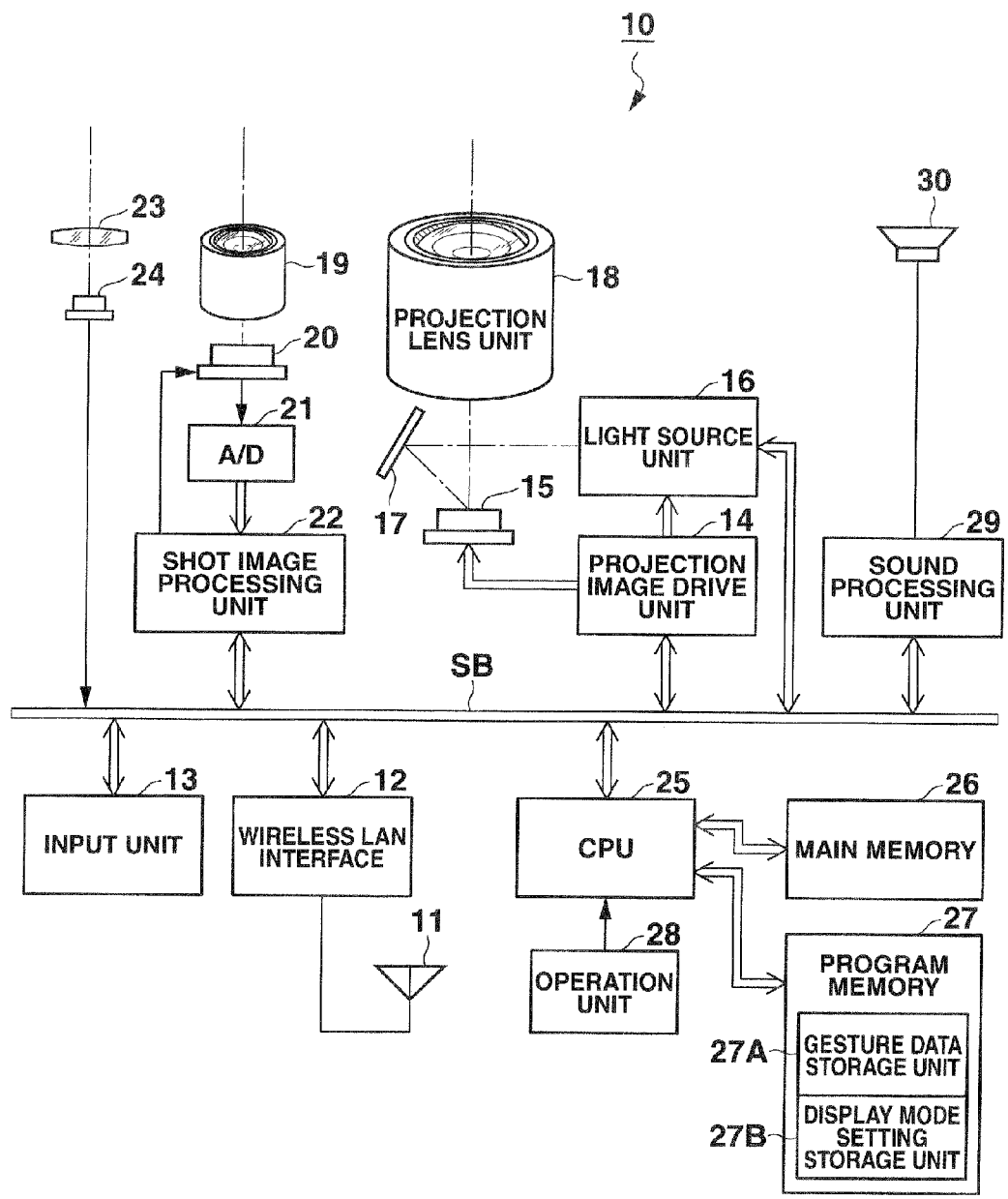
FIG. 2 is a block diagram explaining the functional configuration of an electronic circuit of the projector apparatus according to the embodiment.

FIG. 2 is a view for mainly explaining the functional configuration of an electronic circuit provided in the projector apparatus described above.

As shown in FIG. 2, an image signal based on wireless is input from a wireless LAN antenna 11 through a wireless LAN interface 12, and an image signal from a wireline-connected external device (not shown) is input through an input unit 13.

The wireless LAN interface 12 is, for example, a Wi-Fi-compatible interface circuit conforming to IEEE 802.11a/b/g/n, and controls wireless transmission/reception of data between the electronic circuit and, for example, a personal computer or the like operating as an external device through the wireless LAN antenna 11 under the control of a CPU 25 to be described later.

The input unit 13 includes, for example, a pin jack (RCA) type video input, terminal, C-sub 15 type RUB input terminal, image/sound input terminal of the high-definition multimedia interface (HDMI) standard, and universal serial bus (USB) connector.

An image signal or a sound signal is input from an external device wireline-connected through one of these terminals.

Each of image signals of various standards input from the wireless LAN interface 12 or the input unit 13 is digitized, and is thereafter sent to a projection image drive unit 14 through a system bus SE.

This projection image drive unit 14 display-drives a micromirror element 15 according to image data sent thereto by higher-speed time-division drive obtained by multiplication of a frame rate in a predetermined format (for example, 60 [frames/sec.]), division number of color components, and display gradation number.

The micromirror element 15 individually subjects each of inclination angles of a plurality of micromirrors arranged in a form of an array corresponding to, for example, a WXGA (1280 pixels in the lateral direction×768 pixels in the longitudinal direction) to an on/off operation at high speed to carry out a display operation, whereby a light figure is formed by the reflected light.

On the other hand, primary-color light components of red, green, and blue are cyclically emitted from a light source unit 16 by time division.

The light source unit 16 includes LEDs which are semiconductor light-emitting devices, and repetitively emits primary-color light components of red, green, and blue by time division.

LEDs provided in the light source unit 16 may include an LD (semiconductor laser), and organic EL element as LEDs in a broad sense.

Each of the primary color light components emitted from the light source unit 16 is subjected to total reflection by a mirror 17 to be applied to the micromirror element 15.

Further, a light figure is formed by the light reflected from the micromirror element 15, and the formed light figure is projected onto the outside through a projection lens unit 18 to be displayed.

The projection lens unit 18 includes, in the internal lens optical system, a focusing lens configured to move the focus position, and zoom lens configured to vary the zoom (projection) field angle.

Each of these lenses is selectively driven to a position in the optical axis direction by a lens motor (not shown).

Further, an imaging lens unit 19 is arranged adjacent to the projection lens unit 18.

The imaging lens unit 19 includes a focusing lens configured to move the focus position, and is provided with such an imaging field angle as to cover a wider range than the projection field angle on the widest-angle side of the projection lens unit 18.

An external light figure incident on the imaging lens unit 19 is formed on a CMOS image sensor 20 which is a solid-state image sensing device.

An image signal obtained by the image formation on the CMOS image sensor 20 is digitized by an A/D converter 21 and, is thereafter sent to a shot image processing unit 22.

The shot image processing unit 22 scanning-drives the CMOS image sensor 20 to cause the sensor 20 to execute a continuous imaging operation, and carries out image processing such as contour extraction and detection of movement between images for each of time-series image data items obtained by imaging, or the like, to thereby recognize each person taken into the image, calculate a direction of each person, and extract a gesture or the like of each person as will be described later.

Furthermore, in close vicinity to the projection lens unit 18 and imaging lens unit 19, an infrared sensor 24 is provided through a lens 23 such that a detection range thereof becomes equal to the imaging lens unit 19.

The infrared sensor 24 is provided as a human-sensitive sensor and, when a human body exists within the widest-angle projection range, detects infrared rays emitted from the human body.

A detection result is digitized, and is thereafter output to the CPU 25 to be described later.

All the operations of the circuits described above are controlled by the CPU 25.

The CPU 25 is directly connected to a main memory 26 and program memory 27.

The main memory 26 is constituted of, for example, an SRAM, and functions as a work memory of the CPU 25.

The program memory 27 includes an electrically rewritable nonvolatile memory, such as a flash ROM, and stores therein an operation program to be executed by the CPU 25, various stylized data items, and the like.

The program memory 27 includes a gesture data storage unit 27A, and display mode setting storage unit 27B.

The gesture data storage unit 27A stores therein preset data expressing the contents of a gesture operation of an observer by time-series motion vectors.

Although details of the display mode setting storage unit 27B will be described later, the unit 27B stores therein data of various display mode setting items of an image to be displayed as the image IM.

The CPU 25 reads the operation program and stylized data stored in the program memory 27, spreads and stores the read program and data in the main memory 26 and, thereafter executes the program, thereby controlling the projector apparatus 10 in a centralized manner.

The CPU 25 executes various projection operations according to operation signals from an operation unit 28. This operation unit 28 receives a key operation signal transmitted from a remote controller (not shown) dedicated to the projector apparatus 10 through an infrared receiving unit provided in the main body of the projector apparatus 10, and sends out a signal corresponding to the contents of the key operation to the CPU 25.

As the operation signal received by the operation unit 28 from the remote controller (not shown), for example, power-on/off of the projector apparatus 10, and specified information or the like of the user to be described later are included.

Further, the CPU 25 determines to what operation the contents of a gesture correspond in cooperation with the shot image processing unit 22.

The CPU 25 is further connected to a sound processing unit 29 through the system bus SB.

The sound processing unit 29 is provided with a sound source circuit such as a PCM sound source or the like, converts a sound signal given at the time of projection operation to analog data, drives a speaker unit 30 to loudspeaker-release the sound or generate beep sound or the like as the need arises.

Next, operations of the embodiment will be described below.

It should be noted that the operations shown below are executed after an operation program, stylized data, and the like read by the CPU 25 from the program memory 27 are expanded on the main memory 26.

The operation program and the like stored in the program memory 27 include not only those stored in advance in the program memory 27 at the shipment of the projector apparatus 10 from the factory, but also contents obtained by installing a program and the like for version upgrades downloaded from a personal computer or the like (not shown) through the wireless LAN interface 12 and wireless LAN antenna 11 via the Internet after the user has purchased this projector apparatus 10.

Figure 3:
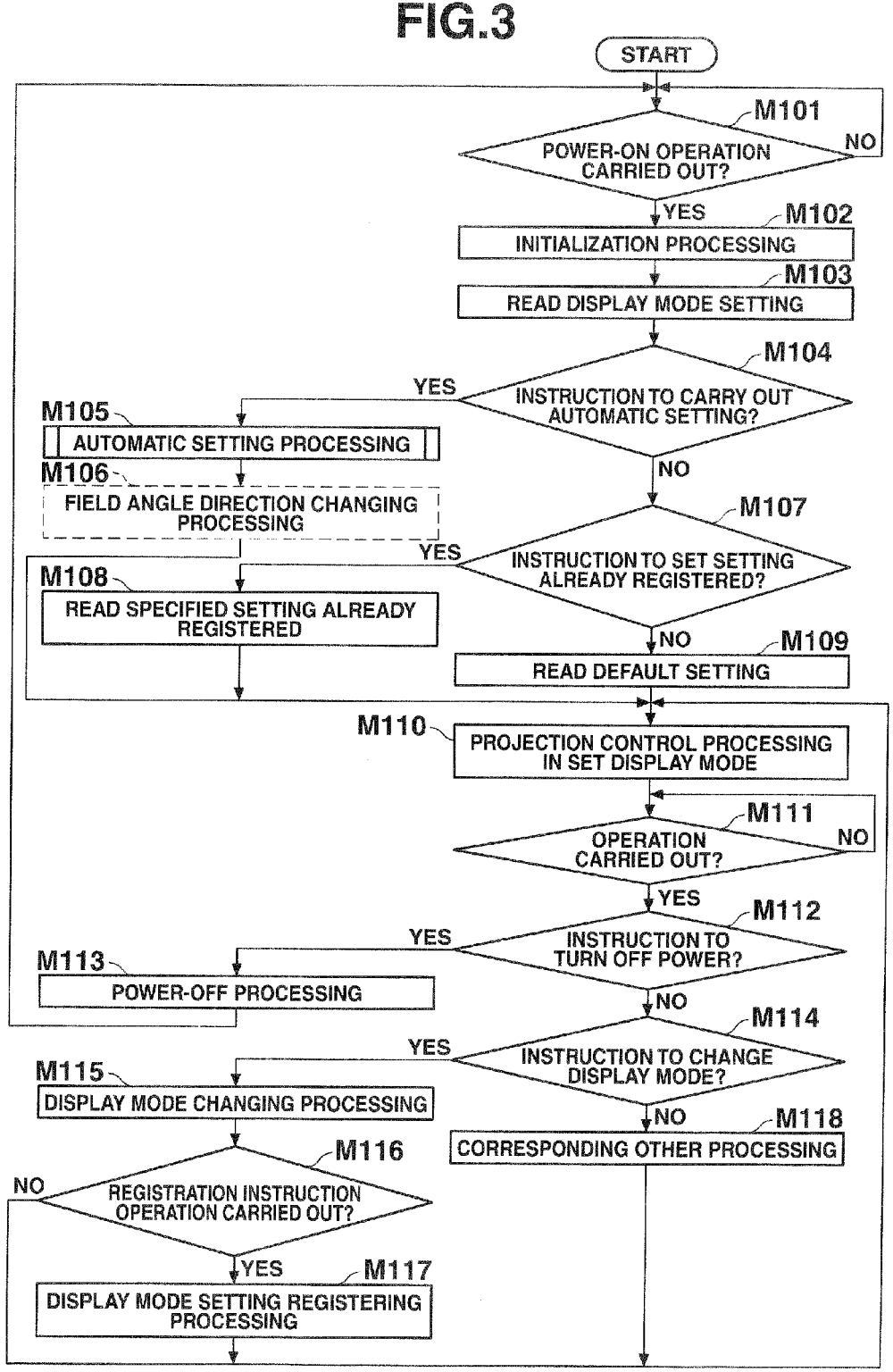
FIG. 3 is a flowchart showing processing contents of a main routine of a projection operation according to the embodiment.

FIG. 3 is an example of a flowchart showing processing contents of a main routine of a fundamental operation executed by the CPU 25.

The CPU 25 is, in the beginning, on standby while monitoring whether or not there is a key operation of turning on the power from the remote controller by using the operation unit 28 (step M101).

At the point, in time at which the key operation of turning on the power has been carried out at the remote controller, the CPU 25 determines in step M101 that the key operation has been carried out, and executes predetermined initialization processing (step M102).

Subsequently, the CPU 25 reads status information which has been automatically registered as display mode setting of the image in order to continue the operation at the time of the last power-off from the program memory 27 (step M103), and determines whether or not the read information is an instruction to carry out automatic setting (step M104).

Here, when it is determined that the information is not an instruction to carry out automatic setting, the CPU 25 subsequently determines whether or not the information is an instruction to set a setting already registered (step M107).

When it is determined that the read status information of setting is an instruction to set a setting already registered, the CPU 25 reads the specified setting information already registered from the program memory 27, and sets the read information (step M108).

Further, when it is determined that the status information of setting read in step M107 is not an instruction to set the already registered setting, the CPU 25 reads default setting information prepared in advance, such as a predetermined direction and size (zoom field angle), and sets the read setting information irrespective of the shape, and direction of the table TB positioned directly under the projector apparatus 10, and the number, arrangement, and the like of observers present at the table TB (step M109).

Further, when it is determined that the information read in step M104 is an instruction to carry out automatic setting, the CPU 25 executes automatic setting processing in accordance with the read information (step M105).

Figure 4:
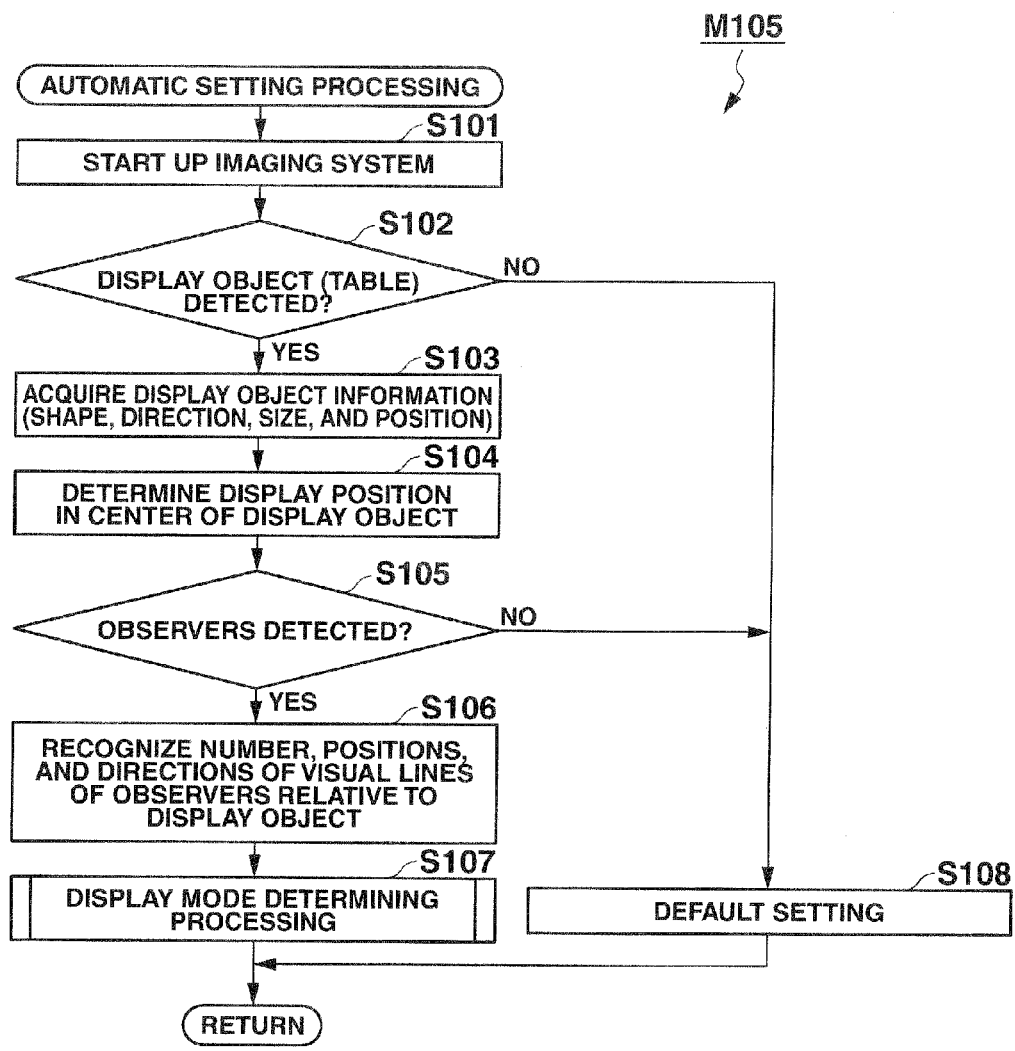
FIG. 4 is a flowchart showing processing contents of a subroutine of automatic setting processing of FIG. 3 according to the embodiment.

FIG. 4 is an example of a flowchart of subroutine showing detailed processing contents of the automatic setting processing of step M105.

In the beginning, the CPU 25 starts the operation of the imaging system including the CMOS image sensor 20, and A/D converter 21 through the shot image processing unit (step S101), and carries out shooting of an image of the table TB and observers who would be positioned around the table TB.

Here, it is determined by the CPU 25 whether or not the table TB which is the display object of the image to be displayed could have been detected from the shot image by the image processing carried out by the shot image processing unit 22 (step S102).

When the table TB could not have been detected, the CPU 25 reads and sets a preselected default setting, such as a predetermined direction and size (zoom field angle) (step S108) and, thereafter terminates the subroutine of FIG. 4 to return to the main routine of FIG. 3.

Further, when it is determined in step S102 that the table TB which is the display object can be detected, the CPU 25 acquires a shape, direction, size (in the image), and position of the detected table TB which becomes the display object (step S103) and, thereafter, for the time being, temporarily determines the center position of the table TB as the position at which the image is to be displayed (step S104).

Subsequently, the CPU 25 determines whether or not presence of the observers could have been detected from the periphery of the table TB on the basis of the image processing result of the shot image processing unit 22 (step S105).

At this time, the CPU 25 may additionally utilize information of a heat source emitting infrared rays obtained from the infrared sensor 24 through the lens 23 for detection of presence of the observers.

Here, when it is determined that presence of the observers P1 to P3 could not have been detected, the CPU 25 reads a preselected default setting, such as a predetermined direction and size (zoom field angle) from the program memory 27 to set the read setting as a setting other than the setting of the display position of the image set in preceding step S104 (step S108), and terminates the subroutine of FIG. 4 to return to the main routine of FIG. 3.

Further, when it is determined in step S105 that presence of the observers could have been detected, the CPU 25 recognizes the number and positions of the observers relative to (toward) the table TB which is the display object by image processing by using the lens 23, and extracts (acquires) these information items (step S106).

It should be noted that although in step S106, the CPU 25 may recognize even the direction of a face of each observer, and may recognize even the direction of a visual line of each observer, even by simple processing capable of detecting only a position of each observer, it is possible to determine a direction of each observer by assuming that each observer is positioned frontally with respect to the table TB.

Accordingly, the CPU 25 can determine the direction of a visual line of each observer without recognizing even the direction of the face.

Further, the CPU 25 determines how to set the display mode of the image on the basis of the extracted number, positions, and directions of the visual lines of the observers (step S107).

Figure 5:
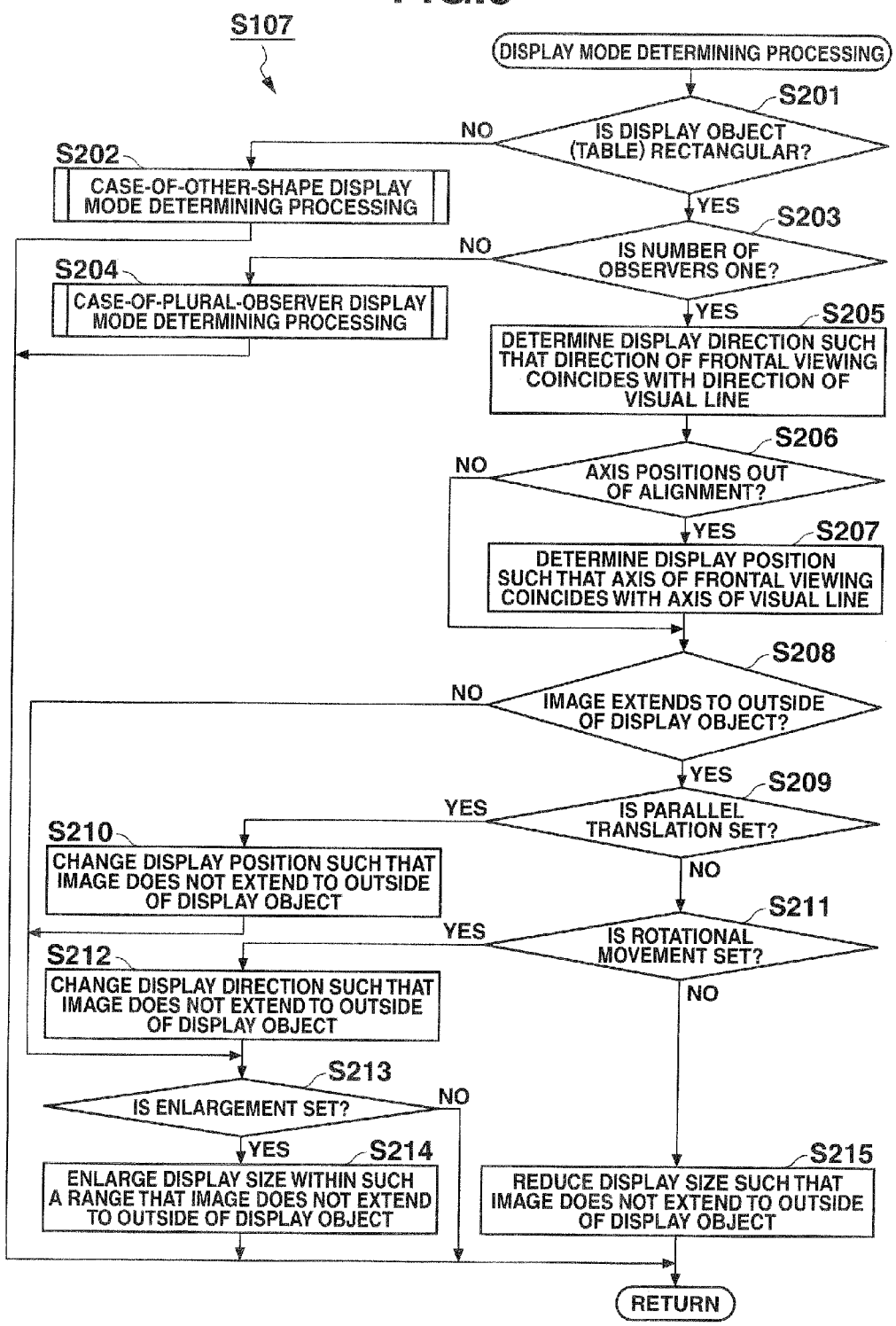
FIG. 5 is a flowchart showing processing contents of a subroutine of display mode determining processing of FIG. 4 according to the embodiment.

FIG. 5 is an example of a subroutine showing more detailed contents of the display mode determining processing in step S107.

In the beginning of the processing, the CPU 25 determines whether or not the shape of the table TB is a rectangle which is recognized to be the most orthodox shape (step S201).

When it is determined here that the shape of the table TB is a rectangle, the CPU 25 subsequently determines whether or not the number of the observers is one (step S203).

When it is determined that the number of the observers is one, the CPU 25 determines the direction (direction of frontal viewing) of the image to be displayed such that the direction (vector direction) of frontal viewing of the image to be subsequently displayed coincides with the direction (vector direction) of the observer by assuming that the observer is positioned frontally with respect to the table TB which is the display object (step S205).

Subsequently, the CPU 25 determines whether or not axis positions of the determined direction of the image and direction of the observer are out of alignment with each other (step S206) and, when it is determined that the axis positions are out of alignment with each other, the CPU 25 determines (corrects) the position of the image to be displayed such that the axis of frontal viewing of the image to be displayed coincides with the axis of the direction of the observer (step S207).

Thereafter, the CPU 25 determines, in view of the display size of the image set at that point in time, whether or not the range of the image to be displayed extends to the outside of the table TB (step S208).

When it is determined that the range extends to the outside of the table TB, the CPU 25 determines whether or not setting has been established in advance such that parallel translation (movement) is to be carried out as processing setting for the case where the range extends to the outside of the table TB (step S209).

When it is determined that setting has already been established in advance such that parallel translation is to be carried out, the CPU 25 changes the setting of the display position in order to carry out parallel translation of the display position, such that the image to be displayed does not extend to the outside of the table TB in accordance with the setting (step S210).

Further, when it is determined in step S209 that setting has not been established such that parallel translation is to be carried out, the CPU 25 subsequently determines whether or not setting has been established in advance such that rotational movement is to be carried out as processing setting for the case where the range extends to the outside of the table TB (step S211).

When it is determined that setting has been established in advance such that rotational movement is to be carried out, the CPU 25 changes the setting of the display direction in order to carry out rotational movement of the display direction, such that the image to be displayed does not extend to the outside of the table TB in accordance with the setting (step S212).

When it is determined in step S211 that setting has not been carried out such that rotational movement is to be carried out, the CPU 25 determines that it is not possible to cause the image not to extend to the outside of the table TB without changing the size of the image to be displayed, and carries out setting of reducing the size of the image to be displayed such that the image to be displayed can be displayed as large as possible within such a range that the image does not extend to the outside of the table TB (step S215), thereby terminating the subroutine of each of FIG. 5 and FIG. 4, and returning to the main routine of FIG. 3.

Further, when it is determined in step S208 that the image does not extend to the outside of the table TB which is the display object, or when the display position is changed in step S210 by parallel translation such that the image does not extend to the outside of the table TB, or when the display direction is changed in step S212 by rotational movement such that the image does not extend to the outside of the table TB, the CPU 25 subsequently determines whether or not setting of instructing to enlarge the image to be displayed has been registered in advance at that point in time (step S213).

When it is determined here that the setting has already been established, the CPU 25 carries out setting of enlarging the range of the image to be displayed within such a range that the image does not extend to the outside of the table TB which is the display object (step S214), and terminates the subroutine of each of FIG. 5 and FIG. 4 to return to the main routine of FIG. 3.

It should be noted that, although the case where either of parallel translation or rotational movement is set has been described here for the sake of easy understanding, it may be made possible to set both of them at a time.

Figure 9A:
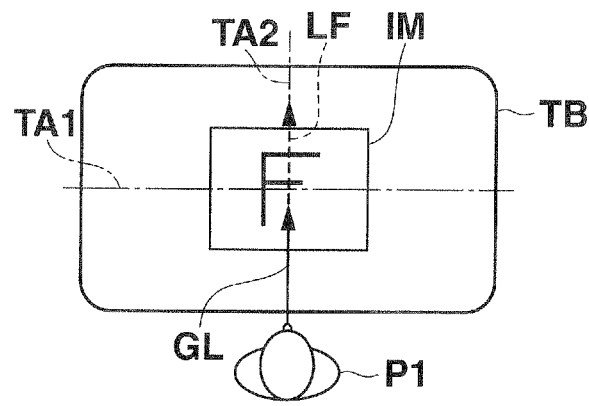
FIGS. 9A, 9B, and 9C are views each exemplifying a display mode of an image corresponding to a positional relationship between a table and observer.

FIG. 9A shows a state where one observer P1 is positioned frontally with respect to the rectangular table TB in the center of the long side thereof, and the display mode (frontal viewing direction of the image IM) is determined for the image IM to be displayed in the center of the table TB, such that the frontal viewing direction LF of the image coincides with the direction. GL of the observer P1.

Hereinafter, in the drawings, the contents of the image IN are shown as a character "F" of the alphabet such that the frontal viewing direction of the image IN can be recognized.

In the drawings, TA1 and TA2 are central axis lines along the long sides and short sides of the rectangular table TB, respectively, and FIG. 9A shows a state where each of the frontal viewing direction LF the image IM, and direction GL of the observer P1 coincides with the central axis line TA2 along the short sides of the table TB.

Accordingly, in such a setting state of the display mode, the CPU 25 determines in step S206 that there is no misalignment between both the axes GL and LF, and further determines that the image IM does not extend to the outside of the table TB, thereby terminating the determining processing of the display mode after appropriately executing enlargement processing of the image within such a range that the image does not extend to the outside of the table on the basis of setting prepared in advance.

Figure 9B:
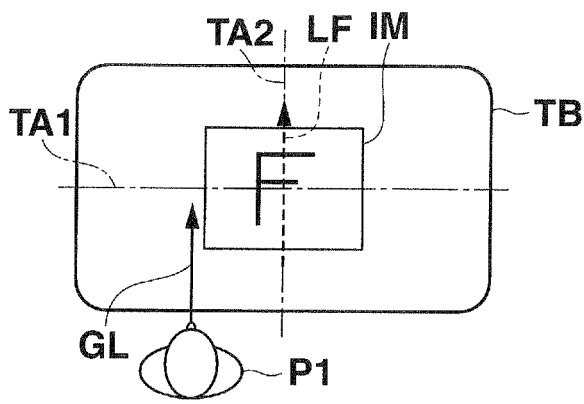

FIG. 9B shows a state where an observer P1 is positioned frontally with respect to the rectangular table TB at a position of the long side of the table TB deviating from the center of the long side, and the display mode (frontal viewing direction of the image IM) is determined for the image IM to be displayed in the center of the table TB, such that the frontal viewing direction LF becomes parallel to the direction GL of the observer P1.

Figure 9C:
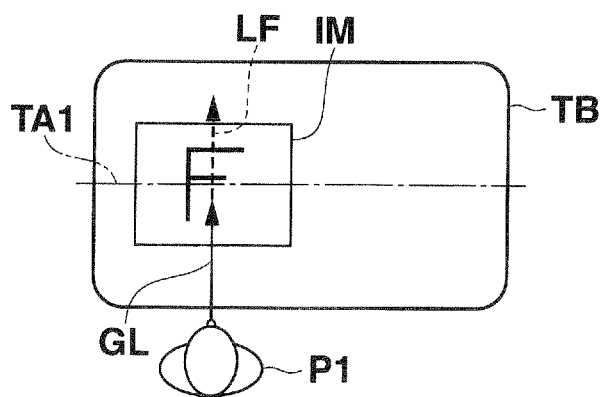

In this case, although the frontal viewing direction LF of the image IM and direction GL of the observer P1 are parallel to each other, both the axis positions obviously deviate from each other, and hence the CPU 25 determines the fact in step S206, and changes the setting of the display position of the image IM such that the positions of the axes do not deviate from each other as shown in FIG. 9C.

Figure 10A:
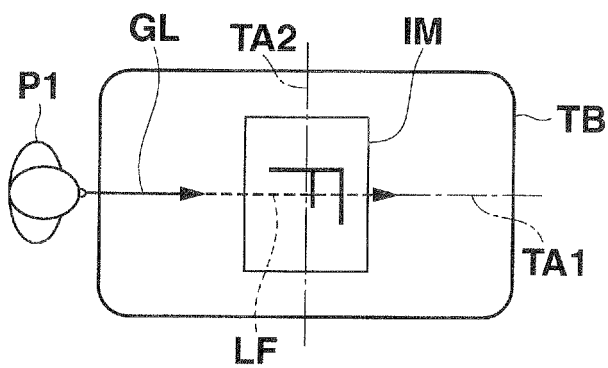
FIGS. 10A, 10B, and 10C are views each exemplifying a display mode of an image corresponding to a positional relationship between a table and observer.

FIG. 10A shows a state where an observer P1 is positioned frontally with respect to the rectangular table TB in the center of the short side thereof, and the display mode (frontal viewing direction of the image IM) is determined for the image IM to be displayed in the center of the table TB, such that the frontal viewing direction LF coincides with the direction GL of the observer P1.

In FIG. 10A, a state where each of the frontal viewing direction CF of the image IM, and direction GL of the observer P1 coincides with the central axis line TA1 of the long sides of the table TB is shown.

Accordingly, even in such a setting state of the display mode, the CPU 25 determines in step S206 that there is no misalignment between both the axes GL and LF, and further determines that the image IM does not extend to the outside of the table TB, thereby terminating the determining processing of the display mode after appropriately executing enlargement processing of the image within such a range that the image does not extend to the outside of the table TB on the basis of setting prepared in advance.

Figure 10B:
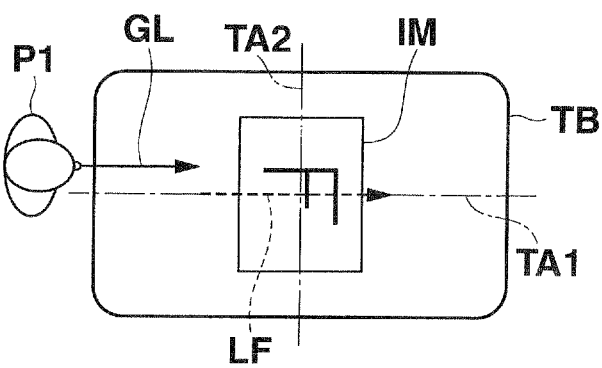

FIG. 10B shows a state where an observer P1 positioned frontally with respect to the rectangular table TB at a position of the short side of the table TB somewhat deviating from the center of the short side, and the display mode (frontal viewing direction of the image IM) is determined for the image IM to be displayed in the center of the table TB, such that the frontal viewing direction LB becomes parallel to the direction GL of the observer P1.

In this case, although the frontal viewing direction LF of the image IM and direction GL of the observer P1 are parallel to each other, the axis positions deviate from each other.

Figure 10C:
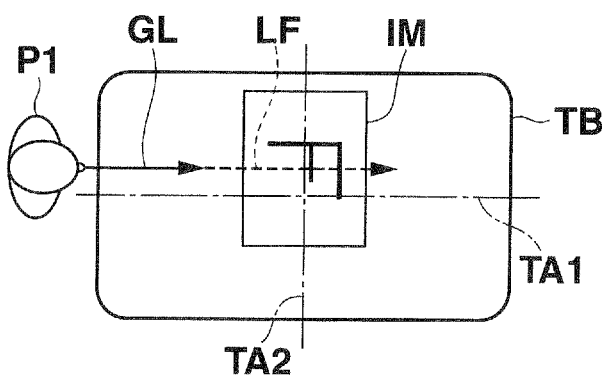

Accordingly, the CPU 25 determines the fact in step S206, and changes the setting of the display position of the image IM such that the positions of both the axes do not deviate from each other as shown in FIG. 10C.

Figure 11A:
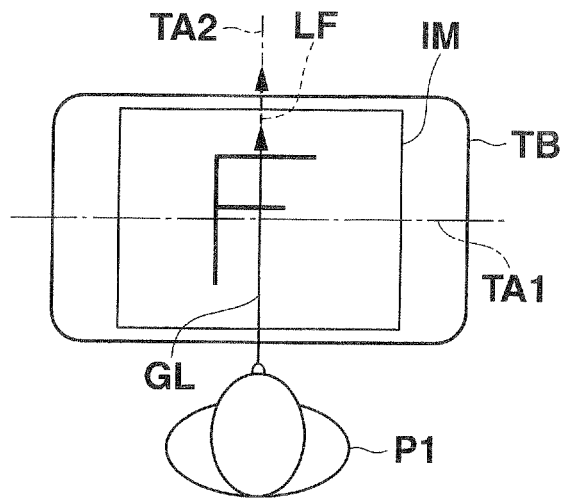
FIGS. 11A, 11B, and 11C are views each exemplifying a display mode of an image corresponding to a positional relationship between a table and observer.

FIG. 11A shows a state where an observer P1 is positioned frontally with respect to the rectangular table TB in the center of the long side thereof, and the display mode is determined for a large image IM to be displayed over almost the whole surface of the table TB in the center of the table TB, such that the frontal viewing direction LF coincides with the direction CL of the observer P1.

Figure 11B:
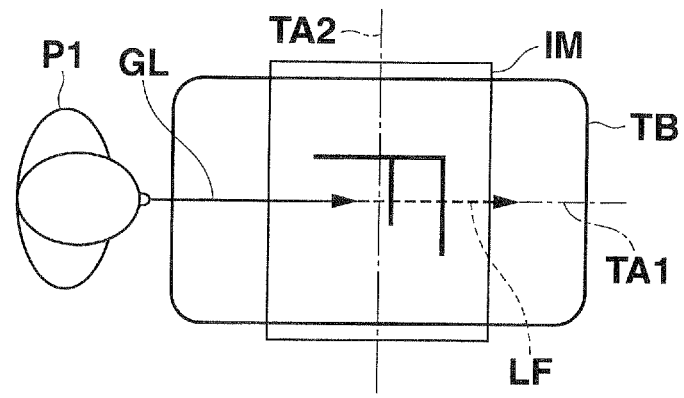

FIG. 11B shows a state where an observer P1 is positioned frontally with respect to the rectangular table TB in the center of the short side thereof, and the display mode is determined for the image IM to extend to the outside of the table TB, and to be displayed large in the center of the table TB, such that the frontal viewing direction LF coincides with the direction GL of the observer P1.

Figure 11C:
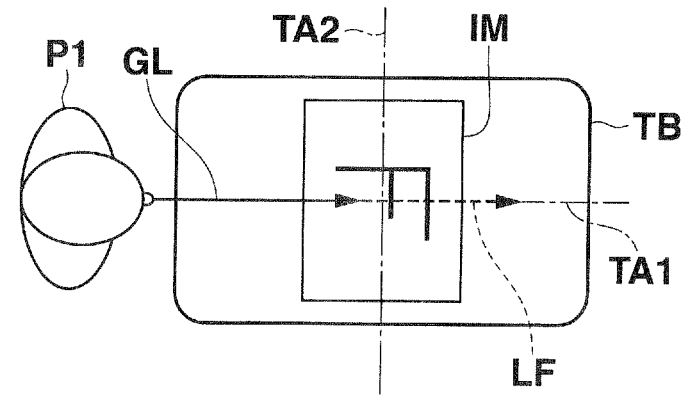

In this case, when the CPU 25 determines in step S208 that the image IM extends to the outside of the display object, the CPU 25 subsequently determines in step S209 that setting of executing parallel translation is not established in advance and, then the CPU 25 further determines in subsequent step S211 that setting of executing rotational movement is not established, then the CPU 25 executes, in subsequent step S215, processing of narrowing the projection field angle by the zoom lens of the projection lens unit 18 in order to reduce the size of the image IF within such a range that the image IM does not extend to the outside of the table TB serving as the display object as shown in FIG. 11C.

Figure 12A:
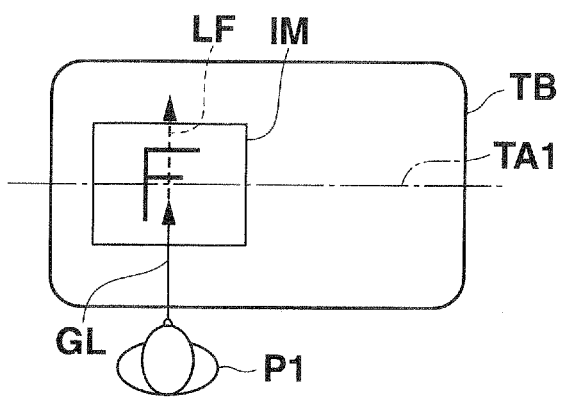
FIGS. 12A and 12B are views each exemplifying a display mode of an image corresponding to a positional relationship between a table and observer.

FIG. 12A shows a state where an observer P1 is positioned frontally with respect to the rectangular table TB at a position of the long side of the table TB deviating from the center of the long side, and the display mode is determined for the image IM to be displayed in front of the observer P1 sitting at the table TB, such that the frontal viewing direction LF of the image IM coincides with the direction GL of the observer P1.

Figure 12B:
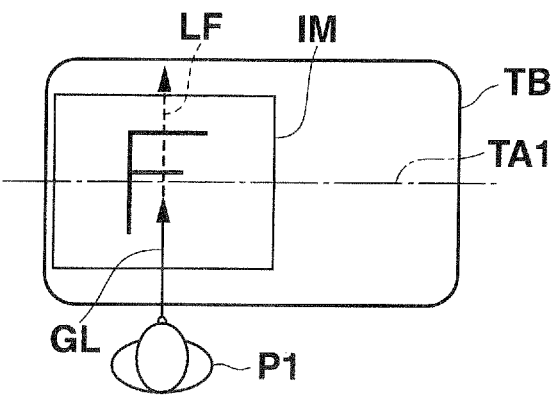

Accordingly, when enlarging setting has already been carried out in such a setting state of the display mode, the CPU 25 determines the fact in step S213, and executes processing of widening the projection field angle by the zoom lens of the projection lens unit 18 in order to further carry out enlarging processing of the image IM within such a range that the image does not extend to the outside of the table TB as shown in FIG. 12B (step S214).

Figure 13A:
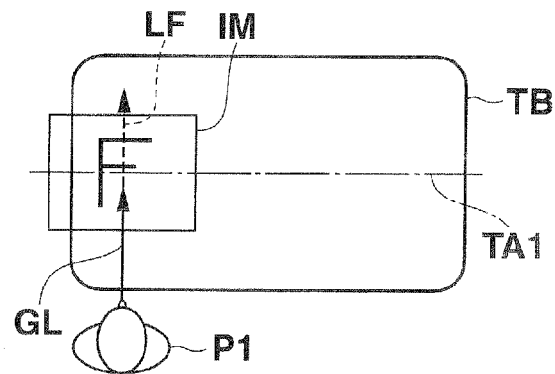
FIGS. 13A, 13B, 13C, and 13D are views each exemplifying a display mode of an image corresponding to a positional relationship between a table and observer.

FIG. 13A shows a state where an observer P1 is positioned frontally with respect to the rectangular table TB at a position of the long side deviating from the center thereof, and the display mode is determined for the image IM to extend to the outside of the table TB, and to be displayed in front of the observer P1 sitting at the table TB, such that the frontal viewing direction LF of the image IM coincides with the direction CL of the observer P1.

In this case, the CPU 25 determines in step S208 that the image IM extends to the outside of the display object.

Figure 13B:
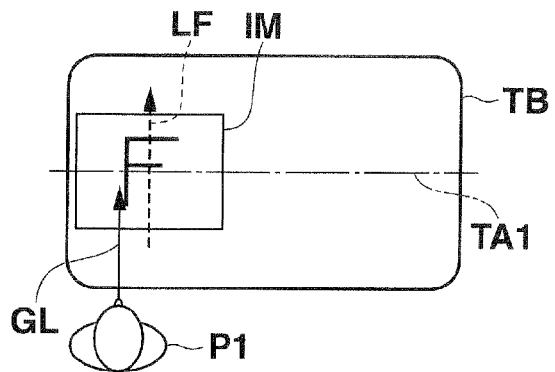

Here, when setting of carrying out parallel translation has already been established, the CPU 25 determines the fact in step S209 and, in subsequent step S210, changes the setting of the display position in order to carry out parallel translation of the image IM within such a range that the image IM does not extend to the outside of the table TB serving as the display object as shown in FIG. 13B.

Figure 13C:
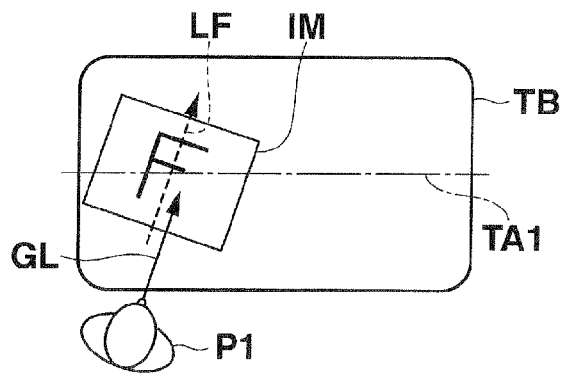

Further, when setting of carrying out rotational movement has already been established in advance in the state of FIG. 13A, the CPU 25 determines the fact in step S211 through step S209 and, in subsequent step S212, changes the setting of the display position in order to carry out rotational movement of the direction of the image IM within such a range that the image does not extend to the outside of the table TB serving as the display object as shown in FIG. 13C.

Figure 13D:
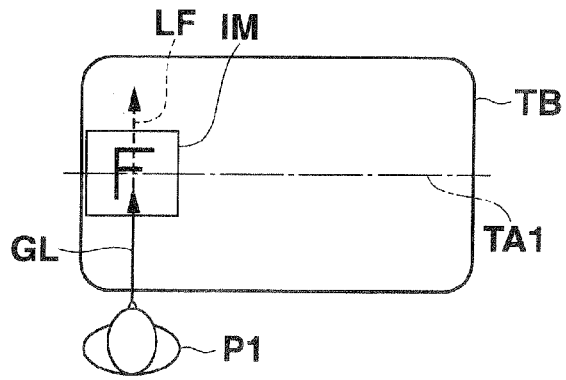

Further, when setting of carrying out neither of parallel translation and rotational movement has been established in advance in the state of FIG. 13A, the CPU 25 determines the fact in steps S209 and S211 and, executes, in subsequent step S215, processing of narrowing the projection field angle by the zoom lens of the projection lens unit 18 in order to carry out reducing processing of the size of the image IM within such a range that the image IM does not extend to the outside of the table TB serving as the display object as shown in FIG. 13D.

Next, returning to FIG. 5, processing to be carried out when it is determined that the shape of the table TB is not a rectangle will be described below.

In such a case, the CPU 25 executes a subroutine of case-of-other-shape display mode determining processing (step S202).

Figure 6:
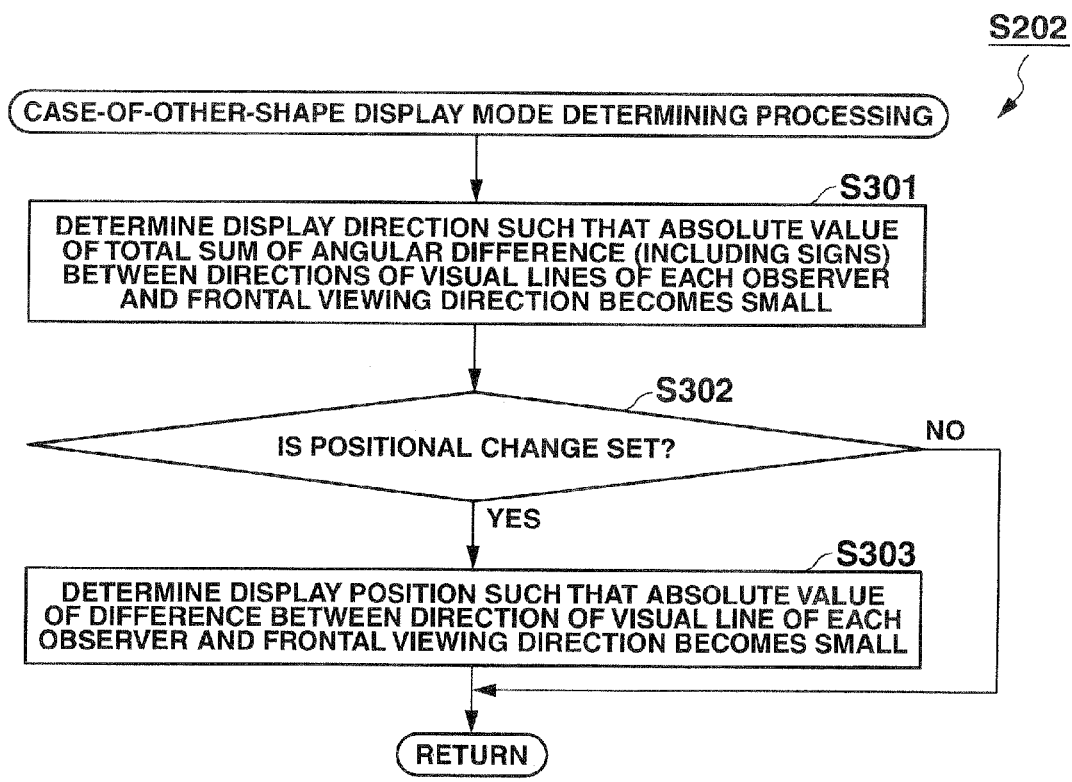
FIG. 6 is a flowchart showing processing contents of a subroutine of case-of-other-shape display mode determining processing of FIG. 5 according to the embodiment.

FIG. 6 is an example of a flowchart showing detailed contents of the case-of-other-shape display mode determining processing which is a subroutine of step S202.

In the beginning of the processing, the CPU 25 determines the direction of the image to be displayed such that an absolute value of a total sum of angular difference between the directions of the visual lines of each observer and frontal viewing direction of the image becomes small, the total sum including signs (step S301).

Subsequently, the CPU 25 determines whether or not setting of carrying out a positional change has been established in advance (step S302).

Here, when it is determined that the setting has already been established, the CPU 25 carries out parallel translation such that an absolute value of a difference between the direction of each observer and frontal viewing direction of the image becomes small to thereby determine the position of the image to be displayed (step S303), and terminates the subroutine of each of FIG. 6, FIG. 5, and FIG. 4 to return to the main routine of FIG. 3.

It should be noted that, before the termination of the processing of FIG. 6, a change in at least one of the position, direction, and size of the image set in advance may be carried out as shown in steps S208 to S215 of FIG. 5 in view of the case where the image to be displayed extends to the outside of the display object.

Figure 14A:
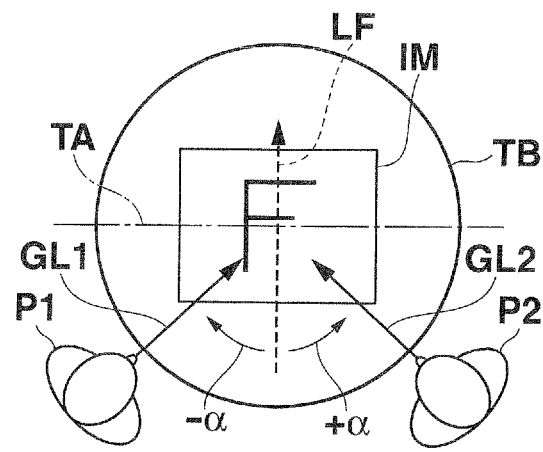
FIGS. 14A, 14B, and 14C are views each exemplifying a display mode of an image corresponding to a positional relationship between a table and observers.

FIG. 14A shows a state where two observers P1 and 22 are positioned frontally with respect to a circular table TB, and an image IM is displayed in the center of the table TB. (The table TB is circular, and hence although it is not possible to set a definite central axis line TA on account of the shape, here a central axis line TA is temporarily set and shown.)

On the basis of the above-mentioned algorithm (5301), first, the CPU 25 temporarily determines a frontal viewing direction of the image IM, and calculates a difference "θ1" between the direction GL1 of the observer P1 and frontal viewing direction LF of the image IM, and difference "θ2" between the direction GL2 of the visual line of the observer P2 and frontal viewing direction LF of the image IN.

Further, the CPU 25 sets (determines) the frontal viewing direction LP of the image IN such that the absolute value of the total sum "θ1+θ2" becomes small.

Then, consequently, the difference "θ1" between the direction GL1 of the observer P1 and frontal viewing direction LF of the image IM, and difference "θ2" between the direction GL2 of the observer P2 and frontal viewing direction LF of the image IM become "+α", and "−α", respectively as shown in FIG. 14A, and their absolute values become equal to each other. As a result, the display mode (frontal viewing direction of the image IM) is determined such that a state where the total sum of the differences becomes "−α+α=0".

That is, when the number of the observers is two, the display mode is determined such that a center of an included angle determined by the two observers P1 and P2, and image IM coincides with the frontal viewing direction of the image IM.

In cases other than the above, the total sum "θ1+θ2" becomes a value other than 0, and the absolute value thereof becomes larger.

Further, when it is determined in step S302 that a positional change has been set in advance, processing of changing the position is executed within such a range that the image IM does not extend to the outside of the table TB such that an absolute value (α in the above example) of a difference between the direction of each of the observers and frontal viewing direction of the image becomes small, with the table TB serving as the display object recognized, as described in step S303.

Figure 14B:
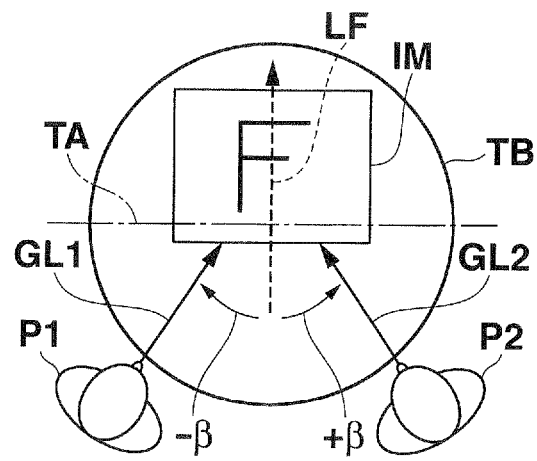

Then, as shown in FIG. 14B, the setting is changed such that the display position of the image IM is subjected to parallel translation along the axis of the frontal viewing direction LF of the image IM, and in a direction in which the image IM is farther (away) from the two observers P1 and P2.

At this time, when it is assumed that a difference between the direction GL1 of the observer P1 and frontal viewing direction LF of the image IM is "−β", and a difference between the direction GL2 of the observer P2 and frontal viewing direction LF of the image IM is "+β", a condition "|α|>|β|" is obtained.

That is, in FIG. 14B, although the positional relationship between the table TB, and two observers P1 and P2 is identical to that shown in FIG. 14A, the display position of the image IM is shifted to the inner position away from the observers P1 and P2, whereby the directions of the visual lines of the observers P1 and P2 are consequently changed to the directions in which the observers can view the image IM more easily as shown in FIG. 14B. Accordingly, it becomes possible for the observers P1 and P2 to observe (visually recognize) the image IM in a state (state of "β") where the angle of deviation from the frontal viewing direction is smaller.

It should be noted that from the viewpoint of viewability, there are the element described above implying the angle of deviation between the direction of the observer and frontal viewing direction of the image IM, and an element implying a distance between the observer and image IM.

That is, the second element is based on the concept that the closer the image IM to the observer, the easier the image can be viewed by the observer, and hence when importance is attached to the distance between the observer and image IM, the angle of deviation becomes larger.

Further, the display mode may be determined by taking both the elements into consideration while achieving a balance between them.

For that purpose, it is advisable to set, for example, an evaluation function configured to add the element of the angle of deviation with a weight "a1" multiplied and the element of the distance with a weight "a2" multiplied, search for a condition under which the value of the function takes on an extreme, and make it possible to determine both the elements with a good balance between them.

It should be noted that the concept that the image IM to the observer, the easier the image is viewed by the observer is not limited to the case where the number of the observers is plural.

Figure 14C:
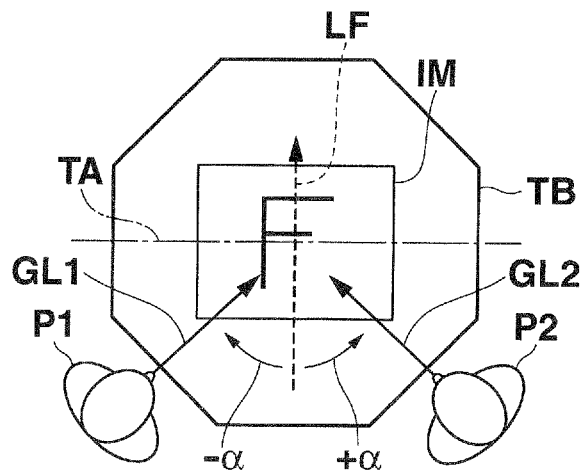

Further, FIG. 14C shows a state where each of two observers P1 and P2 is positioned frontally with respect to an octagonal table TB at a position of each of two sides with one side between them, and an image IM is displayed in the center of the table TB.

In this case, although the table TB is octagonal, a central axis line TA is temporarily set.

In this case too, by executing processing identical to that described previously, it is possible to determine the frontal viewing direction of the image IM in the manner identical to the case of the circular table shown in FIGS. 14A and 14B and, as a result, to determine the frontal viewing direction of the image IM such that a direction corresponding to the center of the table TB viewed from the side positioned between the two observers P1 and P2 becomes the frontal viewing direction of the image IM.

Figure 15A:
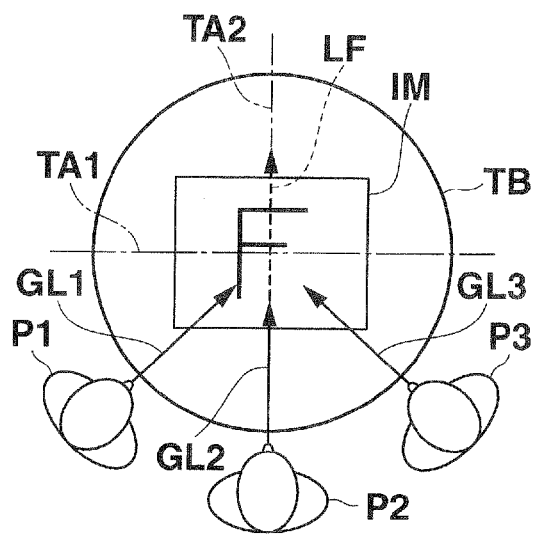
FIGS. 15A, 15B, and 15C are views each exemplifying a display mode of an image corresponding to a positional relationship between a table and observers.

FIG. 15A shows a state where three observers P1 to P3 are respectively positioned frontally with respect to a circular table TB at regular intervals, such that they gather together at one part (at a lower part in FIG. 15A) of the table TB, and an image IM is displayed in the center of the table TB.

On the basis above-mentioned algorithm (S301), it is consequently possible for the CPU 25 to carry out setting such that the direction GL2 of one observer P2 of the three observers P1 to P3, the observer P2 being positioned in the center of them, coincides with the frontal viewing direction LF of the image IM, and FIG. 15A shows such state.

Figure 15B:
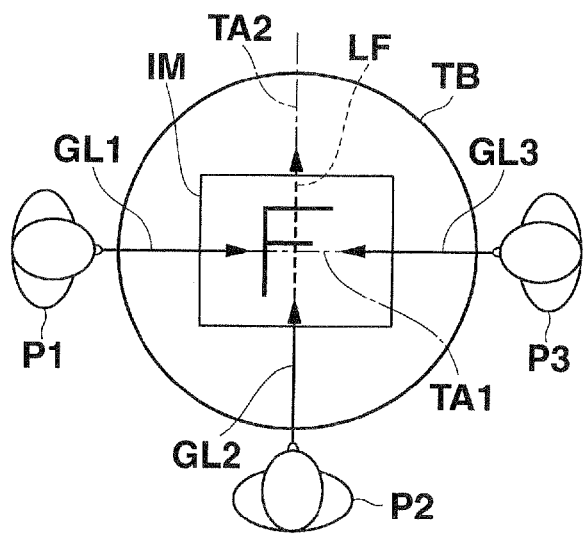

FIG. 15B shows a state where three observers P1 to P3 are respectively positioned frontally with respect to a circular table TB at intervals of 90° such that the observer P1 and the observer P3 are opposed to each other, and an interval between the observer P2 and observer P1 and an interval between the observer P2 and observer P3 are equal to each other and, further, an image IM is displayed at the center of the table TB.

In this case too, by executing processing identical to that described previously, it is consequently possible for the CPU 25, as shown in FIG. 15B, to carry out setting, such that the direction GL2 of one observer P2 of the three observers P1 to P3 coincides with the frontal viewing direction LF of the image IM, the observer P2 being positioned in the center of them, and FIG. 15B shows such state.

Furthermore, in the state shown in FIG. 15B, when it is determined in step S302 that a positional change has been set in advance, processing of changing the position is executed within such a range that the image IM does not extend to the outside of the table TB, such that an absolute value of a difference between the direction of each of the observers and frontal viewing direction of the image becomes small, with the table TB serving as the display object recognized, as described in step S303.

Figure 15C:
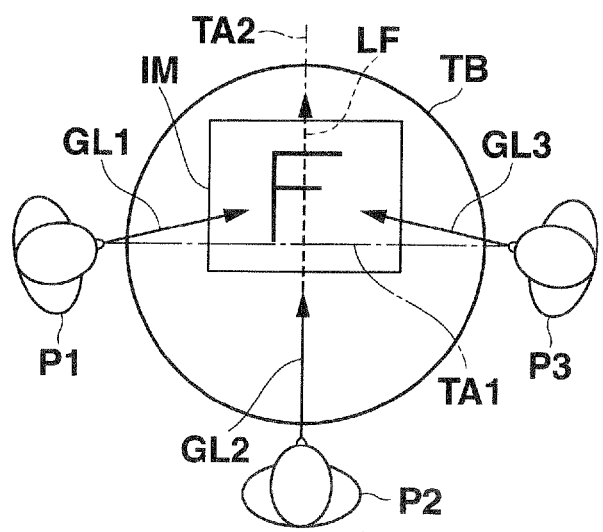

Accordingly, as shown in FIG. 15C, the setting is changed such that the display position of the image IM is subjected to parallel translation along the axis of the frontal viewing direction LF of the image IM coinciding with the direction GL2 of the central observer P2, and in a direction in which the image Id is away from the three observers p1 to P3.

It should be noted that in this case too, the display position may be determined by taking the element of the distance between the observer and image IM into consideration as described above.

As described above, although the algorithm of step S301 of FIG. 6 requires angle calculation, and hence it is processing imposing a somewhat heavy burden on the CPU 25, the algorithm can generally be applied irrespective of the number of observers.

Next, the description returns to FIG. 5, and processing to be carried out in a case where it is determined in step S201 that the shape of the table TB is a rectangle and, thereafter, it is determined in subsequent step S203 that the number of the observers is not one, but is plural will be described below.

In that case, the CPU 25 executes a subroutine of case-of-plural-observer display mode determining processing (step S204).

Figure 7:
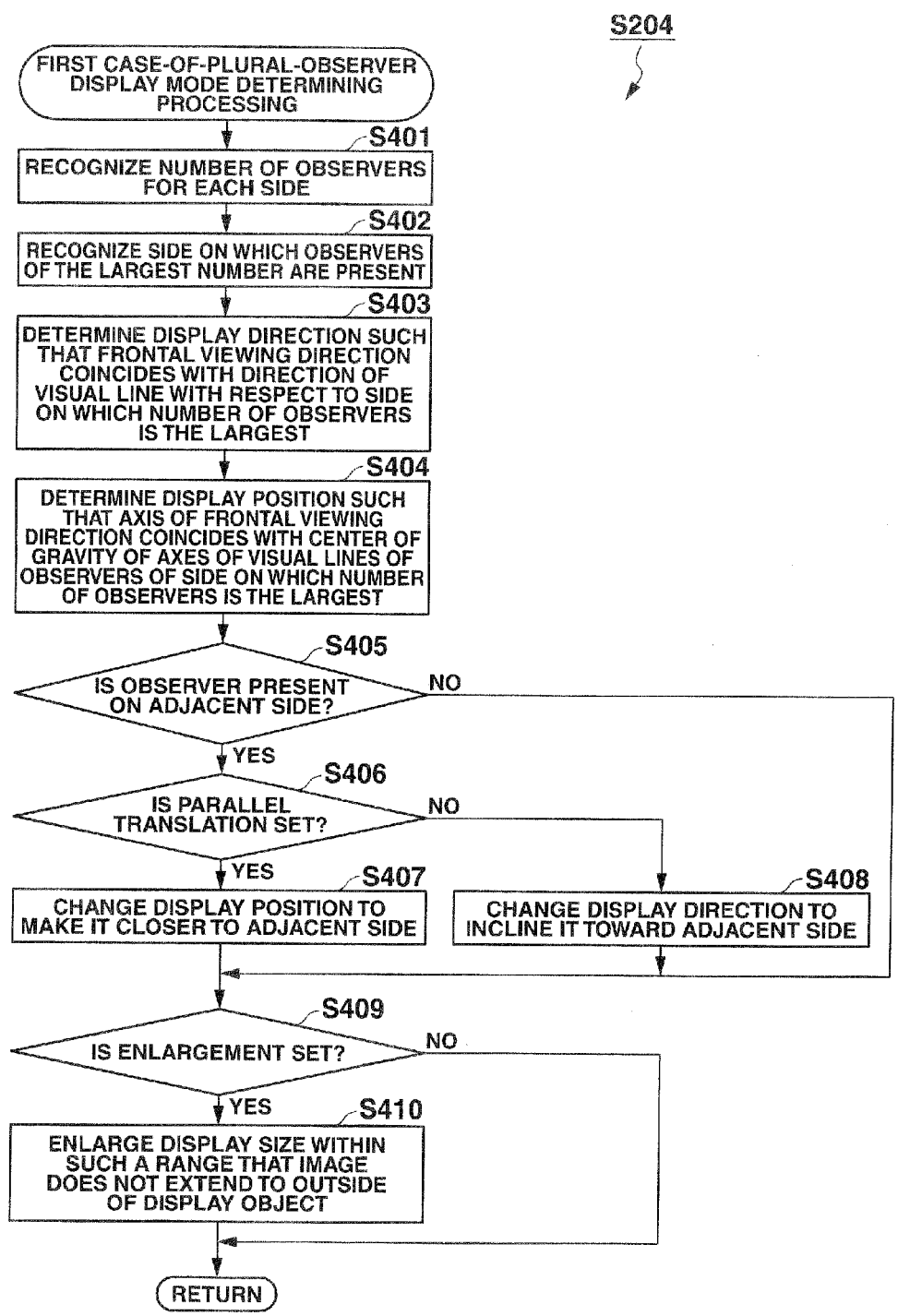
FIG. 7 is a flowchart showing processing contents of a first subroutine of case-of-plural-observer display mode determining processing of FIG. 5 according to the embodiment.

FIG. 7 is an example of a flowchart showing detailed contents of a first example of the case-of-plural-observer display mode determining processing which is the subroutine of step S204.

In the processing, first, the CPU 25 recognizes the number of observers for each of the four sides constituting the rectangle of the table TB by means of the shot image processing unit 22 (step S401).

On the basis of the recognition result, the CPU 25 recognizes a position of a side on which observers of the largest number are present (Step S402).

The CPU 25 determines the frontal viewing direction of the image to be displayed such that the frontal viewing direction of the image to be displayed coincides with directions of the observers with respect to a side on which the number of observers is the largest (step S403).

Subsequently, the CPU 25 determines the position of the image to be displayed such that the axis of the frontal viewing direction of the image coincides with the center of gravity of the axes of directions of the observers of a side on which the number of observers is the largest (step S404).

After thus determining the direction and position of the image to be displayed, the CPU 25 determines whether or not an observer is present also on a side adjacent to the side on which the number of observers is the largest (step S405).

When it is determined here that an observer is present also on the adjacent side, the CPU 25 subsequently determines whether or not setting of subjecting the position of the image to parallel translation has been registered in advance (step S406).

When it is determined here that setting of carrying out parallel translation has been registered in advance, the CPU 25 changes the setting to make the position of the image to be displayed closer to the adjacent side on which an observer is present (step S407).

When it is determined in S406 that setting of carrying out parallel translation has not been registered in advance, the CPU 25 changes the setting to incline the direction of the image to be displayed toward the adjacent side on which an observer is present (step S408).

Thereafter, the CPU 25 determines at that point in time whether or not setting of instructing to enlarge the image to be displayed has been registered in advance (step S409).

When it is determined here that the setting has already been established, the CPU 25 carries out setting of enlarging the range of the image to be displayed within such a range that the image does not extend to the outside of the table TB which is the display object (step S410), and terminates the subroutine of each of FIG. 7, FIG. 5, and FIG. 4 to return to the main routine of FIG. 3.

It should be noted that, although the case where either of parallel translation or rotational movement (inclining operation) is set has been described here for the sake of easy understanding, it may be made possible to set both of them at a time.

Figure 16A:
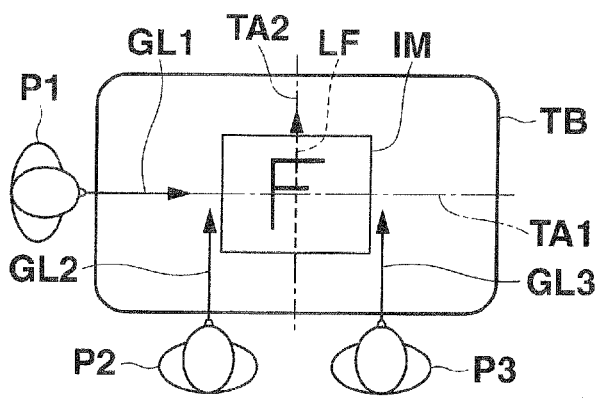
FIGS. 16A, 16B, 16C, and 16D are views each exemplifying a display mode of an image corresponding to a positional relationship between a table and observers.

FIG. 16A shows a display mode of an image IM in a case where two observers P2 and P3 are present on one long side of a rectangular table TB, and one observer P1 is present on one short side adjacent to the long side on the left.

On the basis of the algorithm (steps S401 to S404) described above, it is possible for the CPU 25 to firstly determine the display direction of the image IM such that the image IM is displayed at the center position of the table TB in a direction in which the frontal viewing direction coincides with the directions of the observers when viewed from the long side on which the number of observers is the largest, and FIG. 16A shows such state.

Figure 16B:
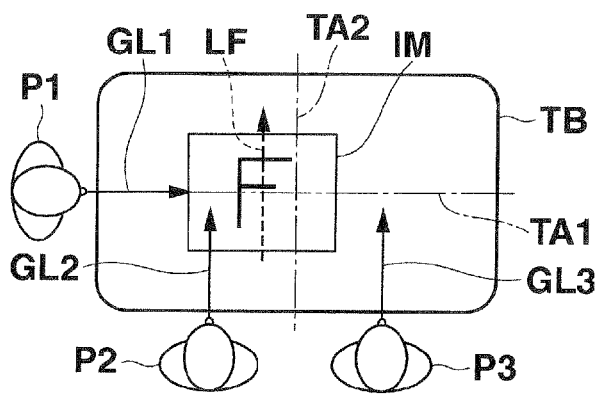

Here, when it is determined in step S406 that setting of carrying cut parallel translation has been registered in advance, the CPU 25 changes the setting to make the position of the image IM to be displayed closer to the leftward adjacent short side as shown in FIG. 16B by the processing of step S407 (step S407).

Figure 16C:
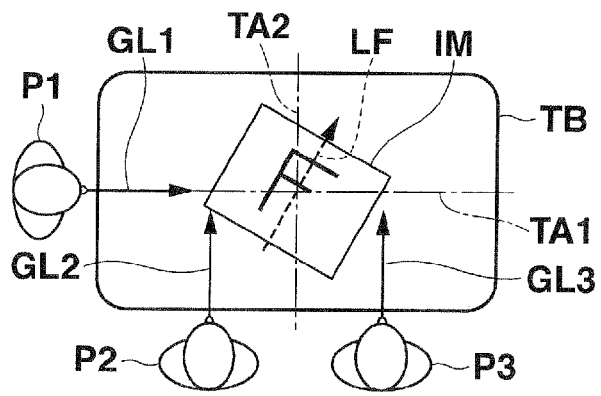

Further, when it is determined in step S406 that setting of carrying out parallel translation has not been registered in advance, the CPU 25 changes the setting to incline the frontal viewing direction LF of the image to be displayed toward the leftward adjacent short side on which the observer P1 is present as shown in FIG. 16C by the processing of step S408.

Figure 16D:
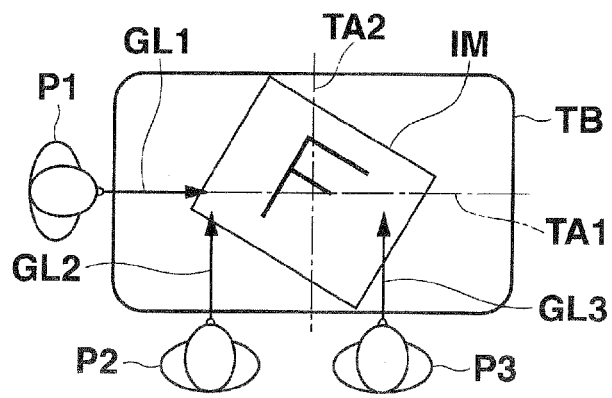

Furthermore, when enlarging setting has been registered in advance in step S409 within such a range that the image does not extend to the outside of the table TB, the CPU 25 enlarges, for example, the display size of the image IM, and displays the image on the table TB as shown in FIG. 16D in place of the display mode shown in FIG. 16C.

Figure 17A:
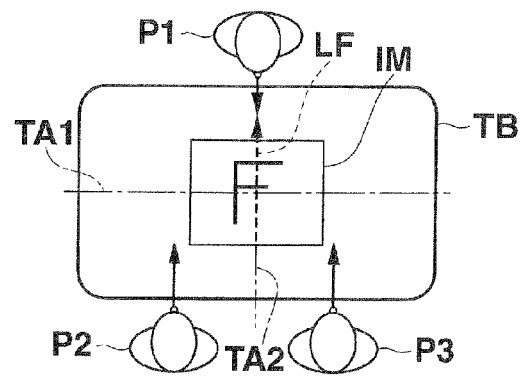
FIGS. 17A, 17B, 17C, and 17D are views each exemplifying a display mode of an image corresponding to a positional relationship between a table and observers.

FIG. 17A shows a display mode of an image IM in a case where two observers P2 and P3 are present on one long side of a rectangular table TB, and one observer P1 is present also on an opposite long side.

On the basis of the algorithm (steps S401 to S404) described above, it is possible for the CPU 25 to determine the display direction of the image IM such that a direction of viewing from the long side on which the number of observers is the largest is made the frontal viewing direction of the image IM, and the image IM is displayed at the center position of the table TB, and FIG. 17A shows such state.

Figure 17B:
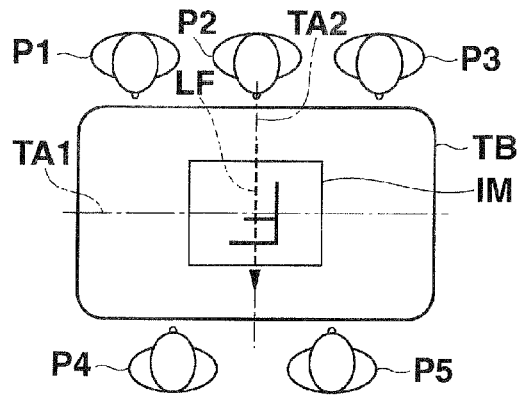

FIG. 17B shows a display mode of an image IM in a case where three observers P1 to P3 are present on one long side of a rectangular table TB, and two observers P4 and P5 are present also on an opposite long side.

Here too, on the basis of the algorithm (steps S401 to S404) described, above, it is possible for the CPU 25 to determine the display direction of the image IM such that a direction of viewing from the long side on which the number of observers is the largest is made the frontal viewing direction of the image IM, and the image IM is displayed at the center position of the table TB, and FIG. 17B shows such state.

Figure 17C:
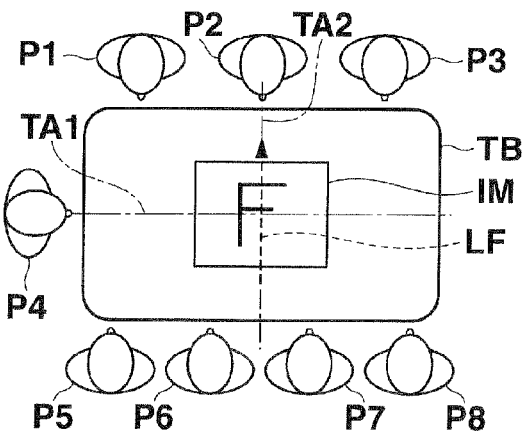

FIG. 17C shows a display mode of an image IM in a case where four observers P5 to P8 are present on one long side of a rectangular table TB, one observer P4 is present on a leftward adjacent short side, and three observers P1 to P3 are present also on an opposite long side.

Here too, on the basis of the algorithm (steps S401 to S404) described above, it is possible for the CPU 25 to determine the display direction of the image IM, such that a direction of viewing from the long side on which the number of observers is the largest is made the frontal viewing direction of the image IM, and the image IM displayed at the center position of the table TB, and FIG. 17C shows such state.

Figure 17D:
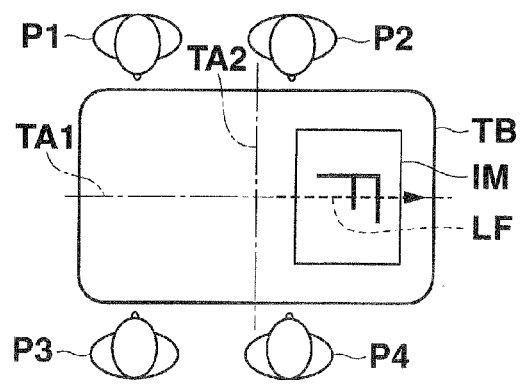

FIG. 17D shows a display mode of an image IM in a case where two observers P1 and P2 are present on one long side of a rectangular table TB, and observers P3 and P4 of the same number of two are present also on an opposite long side.

Here, the numbers of observers of the long sides are identical to each other, and hence a side on which the number of observers is the largest cannot be determined. Accordingly, on the basis of the algorithm (S301) described by the flowchart of FIG. 6, the CPU 25 determines the display direction of the image IM such that the central axis line TA1 along the long sides of the table TB coincides with the frontal viewing direction LF of the image IM.

In this case, furthermore, the observers P1 to P4 are clustered to the left side of the table TB in FIG. 17D on the whole, and hence, on the basis of the algorithm (steps S302 and S303) described by the flowchart of FIG. 6, the CPU 25 attempts to display the image IM after moving the image to the right side in FIG. 17D along the central axis line TA1 of the long sides, whereby an absolute value of a difference between a direction of a visual line of each observer and the frontal viewing direction LF of the image IM is made smaller, and FIG. 17D shows such state.

Further, actually, in FIG. 17D, the visual line of each observer will become in a direction corresponding to the determined position of the image IM.

That is, although in the flowchart of FIG. 7, part of the description is omitted, when a side on which the number of observers is the largest cannot be determined as described above, it is sufficient if the display direction of the image IM is appropriately set on the basis of the general algorithm (S301) described in connection with FIG. 6.

The algorithm shown in FIG. 7 requires no calculation or the like of the sum of angles, and hence is characterized in that it imposes a smaller burden on the CPU 25 than the algorithm shown in FIG. 6.

Next, another type of display mode determining algorithm will be described below.

Figure 8:
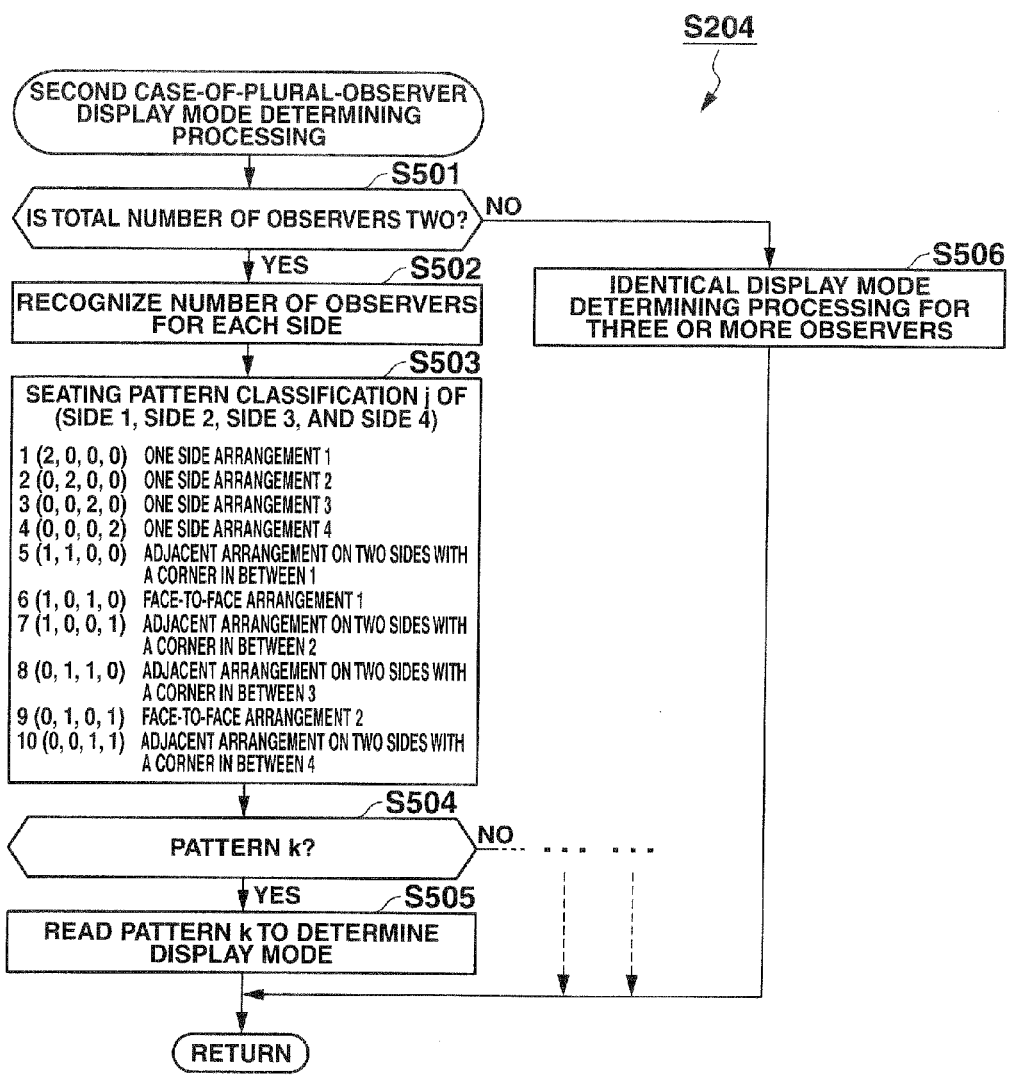
FIG. 8 is a flowchart showing processing contents of a second subroutine of case-of-plural-observer display mode determining processing of FIG. 5 according to the embodiment.

FIG. 8 is a flowchart showing part of detailed contents of a second example of the case-of-plural-observer display mode determining processing which is the subroutine of step S204 in place of the processing of the subroutine described in connection with FIG. 7.

In the beginning of the processing, the CPU 25 determines whether or not the total number of observers present on the four sides constituting the rectangle of the table TB is two by means of the shot image processing unit 22 (step S501).

Here, when it is determined that the total number of observers is two, the CPU 25 recognizes the number of observers for each of the four sides (step S502).

Further, in accordance with the recognized number of observers for each side, the CPU 25 refers to seating pattern classification information stored in advance in the display mode setting storage unit 273 (step S503).

Here, it is assumed that the case where the classification number j of the seating pattern classification is "1" to "10" is exemplified, the display mode setting storage unit 27B stores therein the number of observers of each of the side 1 to side 4 as seating pattern information of (side 1, side 2, side 3, and side 4), and a display mode of the image IM is related to each pattern.

The CPU 25 confirms that there is a corresponding pattern (step S504) and, thereafter reads the corresponding pattern to determine a display mode (step S505), and terminates the subroutine of each of FIG. 8, FIG. 5, and FIG. 4 to return to the main routine of FIG. 3.

Further, when it is determined in step S501 that the total number of observers is three or more, the CPU 25 executes identical display mode determining processing by referring to the seating pattern classification information for three or more observers stored in advance in the display mode setting storage unit 27B of the program memory 27 (step S506).

Regarding the processing of step S506, the description becomes complicated, and hence although the description of the detailed contents is omitted, the display mode of the image IM is univocally determined on the basis of the seating pattern classification information stored in advance in the display mode setting storage unit 27B.

Then, when the determining processing of the display mode of the image IN is executed, the subroutine of each of FIG. 8, FIG. 5, and FIG. 4 is terminated, and the CPU 25 returns to the main routine of FIG. 3.

Before terminating the subroutine of FIG. 8, as shown in steps S208 to S215 of FIG. 5, changing of at least one of the position, direction, and size of the image which are set in advance in view of a case where the image to be displayed extends to the outside of the display object may be carried out.

Figure 18A:
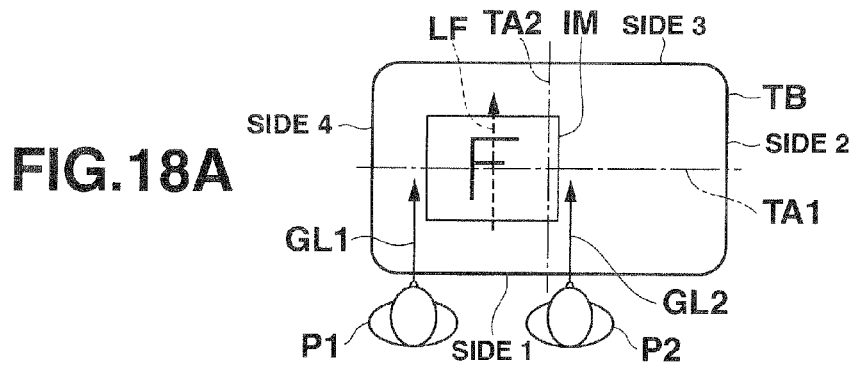
FIGS. 18A, 18B, 18C, and 18D are views each exemplifying a display mode of an image corresponding to a positional relationship between a table and observers.

FIG. 18A shows a display mode of an image IM in a case where two observers P1 and 82 are seated side by side on one side 1 of a rectangular table TB.

On the basis of the above-mentioned algorithm (steps S501 to S505), here the CPU 25 sets the classification number j of the seating pattern classification shown in step S503 to "1" (classification number j="1"), makes the frontal viewing direction LF of the image IM parallel to the directions GL1 and GL2 of the observers P1 and P2 in accordance with the pattern "1" further makes the central axis of the image IM in the horizontal direction coincide with the central axis line TA1 of the table TB along the long sides thereof, whereby the CPU 25 can determine a display mode in which the image IM is arranged at a position equidistant from the observers P1 and P2, and FIG. 18A shows such state.

Figure 18B:
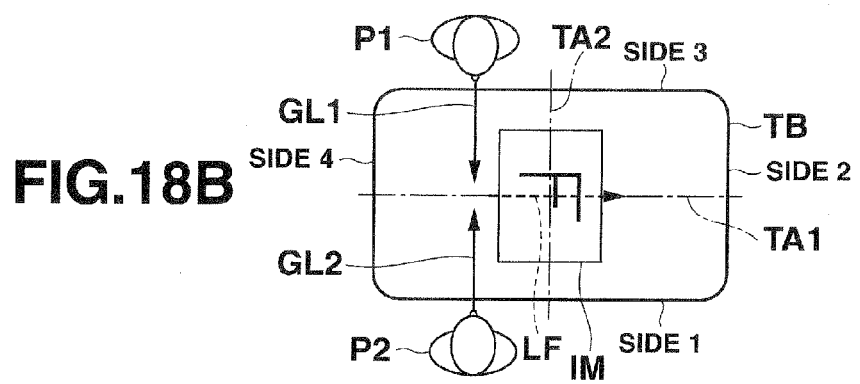

FIG. 18B shows a display mode of an image IM in a case where two observers P1 and P2 are respectively seated face to face on one side 3 of a rectangular table TB, and on one opposite side 1.

On the basis of the above-mentioned algorithm (steps S501 to S505), here the CPU 25 sets the classification number j of the seating pattern classification shown in step S503 to "6" (classification number j="6"), and makes the frontal viewing direction LF of the image IM coincide with the central axis line TA1 of the table TB along the long sides thereof in accordance with the pattern "6", whereby the CPU 25 can determine a display mode in which the image IM is arranged at the middle position of the table TB, and FIG. 18B shows such state.

Figure 18C:
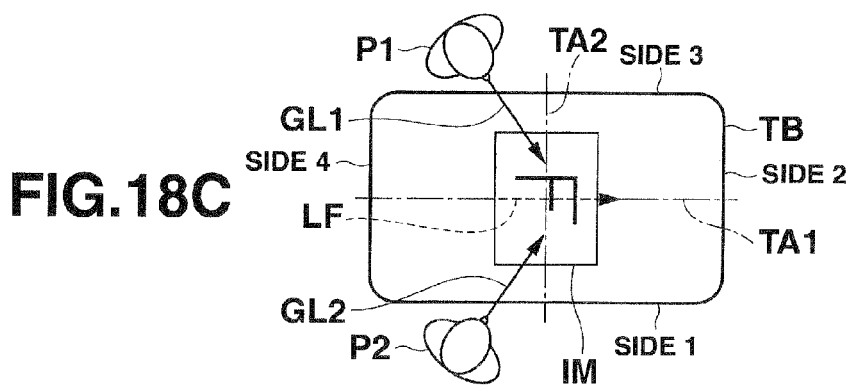

When the display mode is determined in the manner described above, the directions of the visual lines of the two observers P1 and P2 are, as shown in FIG. 18C, actually turned toward the image IM side, thus making the image IM more viewable.

Figure 18D:
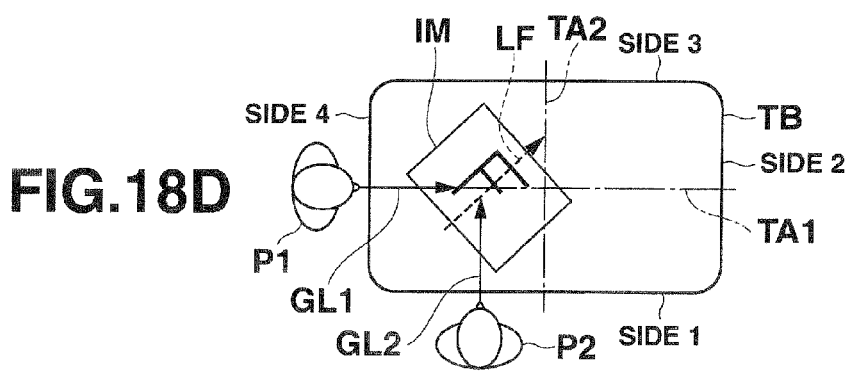

FIG. 18D shows a display mode of an image IM in a case where two observers P1 and P2 are respectively seated adjacently on a side 4, and on a side 1 adjacent thereto.

On the basis of the above-mentioned algorithm (steps S501 to S505), by setting the classification number j of the seating pattern classification shown in step S503 to "7" (classification number j="7"), here the CPU 25 can determine a display mode in which the frontal viewing direction LF of the image IM is arranged at a position separate from the middle position of the table TB and closer to the two observers side, such that the frontal viewing direction LF of the image IM takes an intermediate angular position determined by taking the directions GL1 and GL2 of the two observers into consideration in accordance with the pattern "7", and FIG. 180 shows such state.

The determining processing of the display mode corresponding to the number of observers, and arrangement for the table TB has been described above in detail.

Further, after executing the determining processing, the processing flow is returned to the main routine of FIG. 3, and the processing of step M105 is regarded as having been executed. Furthermore, when a mechanism configured to shift the optical axis to the lens optical system constituting the projection lens unit 18, i.e., a mechanism configured to carry out a so-called "tilt" is formed, processing of preventing the image in a case where the projection optical axis of the projection lens unit 18 is not, perpendicular to the surface of the table TB which is the display object from being deformed by changing the optical axis by swinging or tilting the optical axis by a required amount of angle, i.e., processing such as so-called trapezoidal correction or the like may be carried out (step M106).

Thereafter, while executing display control processing corresponding to the display mode set at that point in time on the table TB which is the display object (step M110), the CPU 25 further determines whether or not any key operation has been carried out by the user by using the operation unit 28 or whether or not an instruction based on a gesture has been issued by the user (step M111).

In this operational state, when a key operation signal is input from the operation unit 28 (or when a gesture instruction is recognized), the CPU 25 determines the fact in step M111, and first determines whether or not the key operation (or gesture) is an instruction to turn off the power (step M112).

When it is determined here that the key operation or the gesture is an instruction to turn off the power, the CPU 25 executes a series of power-off processes, including a range from storing of various setting states to stopping of power supply to circuits other than certain circuits prepared for the next power-on (step M113) and, thereafter returns to the processing starting from step M101.

Further, when it is determined in step M112 that no instruction to turn off the power has been issued, the CPU 25 subsequently determines whether or not an instruction to change the setting of the display mode executed in immediately preceding step M110 has been issued (step M114).

When it is determined here that an instruction to change the setting of the display state has been issued, the CPU 25 carries out processing of executing a change in setting of the display mode in accordance with the issued key operation signal or the gesture instruction (step M115) and, thereafter, further determines whether or not an instruction operation for registering (updating) the contents of the changed setting has been carried out or a gesture instruction to register (update) the contents of the changed setting has been issued (step M116).

When it is determined here that an instruction operation for registration of the contents has been carried cut or a gesture instruction to register the contents has been issued, the CPU 25 executes processing of registering (update) the setting information of the new display mode at that point in time in the display mode setting storage unit 27B of the program memory 27 (step M117) and, thereafter returns to the processing starting from step M110 in order to carry out display again in the setting state of the new display mode.

Further, when it is determined in step M114 that the contents of the operation or the gesture instruction is not an instruction to change the setting of the display mode, the CPU 25 executes corresponding other processing in accordance with the contents of the key operation or the gesture instruction (step M118) and, thereafter returns to the processing starting from step M110.

As described above in detail, according to this embodiment, it becomes possible to realize a more viewable display state without imposing a useless burden on the users constituting the observers, and in view of a case where a plurality of users are present.

It should be noted that as a first modification example of the above-mentioned embodiment, as partly exemplified in the description of FIG. 8, and FIGS. 18A, 18B, 18C, and 18D, detailed display modes based on combinations of a plurality of shapes of the table serving as the display object and positional information on the number of observers may be registered in advance in the display mode setting storage unit 27B of the program memory 27, and the display modes may be read as the need arises to thereby set (determine) an appropriate display mode.

By employing the above procedure, the processing necessary for determination of a display mode is further simplified, and the CPU 25 can realize determination of a display mode within a short time.

Display control based on a display mode to be carried out by the CPU 25 is basically carried out by electronically correcting an image signal input from the wireless LAN antenna 11, wireless LAN interface 12 or the input unit 13.

However, the display control may be realized as a second modification example, as partly described in the above embodiment, by carrying out enlarging/reducing processing by changing the zoom field angle of the projection lens unit 18 or by jointly using a mechanistic mechanism such as a remote pan head (Platform) in the projector apparatus 10 itself, and by integrally controlling these operations.

In this embodiment, an example in which as the means for acquiring the number and positions of the observers, the imaging means is used, and the image obtained by shooting is subjected to image recognition processing has been described.

However, further, as a third modification example, the table or a chair paired with the table may be provided with an optical sensor or a sensor based on a microswitch or the like configured to detect the seating state of the observer.

Furthermore, at the time of taking seats, the seating state may be set by using some input means to be used by at least one of the observers to specify the number and positions of the observers, such as an application program installed in a PC or a smartphone.

By employing the above procedure, the device configuration of the projector apparatus 10 can further be simplified, and a more reliable operation can be realized.

Further, as a fourth modification example, the present invention can also be applied not to a front projector configured to project an image in the front direction as in the case of the above embodiment but to a projector of a rear projection type embedded in the table, or not to a projector apparatus but to various flat panel displays such as a liquid crystal panel, organic EL panel, and the like embedded in the top surface of the table.

In such case, imaging means for acquiring positional information on the display object becomes unnecessary, and hence the configuration of the device can further be simplified.

In this embodiment, the description has been given by assuming that the display object is a table.

However, the application is not limited to the above, and as a fifth modification example, the present invention can also be applied to a case where the image is directly projected on the floor or the like or display is carried out by constituting the floor surface as a display apparatus.

In such case, by assuming that the display object area is an area a range of which does not overlap the observers in terms of position, the display object area can also be applied in a similar way.

In the above embodiment, particularly when the number of observers is one, the display mode is to be determined such that the frontal viewing direction of the image approximately coincides with the direction of the observer, and hence the observer can view the image from the frontal direction.

Further, in the above embodiment, when the number of observers is plural, the display mode including the position and direction of the image is to be determined such that a difference between a direction of each of the observers and frontal viewing direction of the image becomes smaller by assuming that the degrees of priority of the observers are identical to each other, and hence a meeting or the like held by a plurality of persons can smoothly proceed.

Further, in the above embodiment, the display mode including the position and direction of the image is to be determined such that the difference between each of the observers and image becomes smaller, and hence a state where the image is easy to see can be realized.

Furthermore, in the above embodiment, the display mode is to be determined after acquiring the shape of a table or the like which becomes the display object, in accordance with the acquired shape, and hence the image can be displayed in an appropriate state in accordance with the shape of the display object on which the image is actually displayed, irrespective of the usage environment.

Further, particularly in the above embodiment, the detailed display mode is to be determined for the case where the shape of the display object is a rectangle, which is the most orthodox shape, in view of the directions and number of the observers, arrangement for each side, and the like, and hence the embodiment is applicable to a broader number of specific cases, and a meeting or the like held by a plurality of persons can smoothly proceed.

Furthermore, in the above embodiment, the size of the image to be displayed is to be determined after recognizing the range of the display object, and the size of the image is made appropriately enlargeable by arbitrarily setting the size within such a range that the image does not extend to the outside of the display object, and hence it is possible to obtain an image of an appropriate size without the image to be displayed being partly lost, and to display a more viewable image by effectively utilizing the area of the display object as the need arises.

Further, in the above embodiment, the display mode is to be changed by electronically correcting the input image signal, and hence it becomes possible to display an image of an appropriate mode without the device using a mechanistic moving part, and to change the setting of the display mode more easily and with a higher degree of flexibility.

Moreover, in the above embodiment, setting information of a determined display mode is arbitrarily registered such that the registered information can be utilized for the next time and subsequent times, and hence it is made possible, by utilizing the setting information of the past, to set (determine) the display mode within a short time, and further improve the usability.

Further, in the above embodiment, imaging means using a digital camera and technique for image recognition is to be used for recognition of the display object and recognition of the observers, and hence necessary information can be acquired more easily.

Furthermore, in the above embodiment, it is possible to incorporate functions into a conventionally employed projector apparatus of the projection system such as a ceiling-hung type projector or the like, and thus it becomes possible to realize the embodiment by an improvement on a comparatively small scale.

It should be noted that although in the above embodiment, the case where the present invention is applied to a projector apparatus of a ceiling-mounted type employing the DLP® system has been described, the present invention is not limited to the projection system, installation location, light-emitting element of the light source, configurations of various sensors, and the like.

Further, the present invention is not limited to the embodiment described above and, in the implementation phase, can be variously modified within a scope not deviating from the gist thereof.

Further, the functions to be practiced in the embodiment described above may be combined as appropriately as possible with each other to be implemented.

Various phases are included in the embodiment described above and, by appropriate combination of a plurality of disclosed constituent elements, various inventions can be extracted.

For example, even when some of the constituent elements are deleted from all the constituent elements shown in the embodiment, if an advantage can be obtained, the constitution obtained after deletion of the above constituent elements can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
    an input unit configured to input an image signal;
    a display unit configured to display an image based on the image signal input by the input unit on a display object;
    an observer information acquiring unit configured to acquire a number and positions of observers facing the display object;
    a display mode determining unit configured to determine a display mode including a direction of the image to be displayed by the display unit based on the number and the positions of the observers acquired by the observer information acquiring unit; and
    a display control unit configured to cause the display unit to display the image on the display object in the display mode determined by the display mode determining unit;
    wherein the display mode determining unit determines the display mode including the direction of the image such that the image is displayed by the display unit as a single image, when the number of the observers acquired by the observer information acquiring unit is one and when the number of the observers acquired by the observer information acquiring unit is more than one.

2. The display apparatus according to claim 1, wherein:
    the observer information acquiring unit further acquires directions of the observers facing the display object, and
    the display mode determining unit determines the direction of the image to be displayed by the display unit such that the direction of the image substantially coincides with the directions of the observers acquired by the observer information acquiring unit.

3. The display apparatus according to claim 2, wherein the display mode determining unit determines a position of the image to be displayed by the display unit such that an interval between axes indicating the directions of the observers and an axis indicating the direction of the image to be displayed becomes smaller.

4. The display apparatus according to claim 1, wherein:
    the observer information acquiring unit further acquires directions of the observers facing the display object, and
    the display mode determining unit determines, when the number of the observers acquired by the observer information acquiring unit is plural, the direction of the image to be displayed by the display unit such that an absolute value of a total sum of angular differences between the directions of the observers acquired by the observer information acquiring unit and the direction of the image to be displayed becomes small.

5. The display apparatus according to claim 4, wherein the display mode determining unit determines a position of the image to be displayed by the display unit at a position along the direction of the image such that an absolute value of an angular difference between the direction of each of the observers and the direction of the image to be displayed becomes small.

6. The display apparatus according to claim 1, wherein the display mode determining unit determines a position of the image to be displayed by the display unit such that the image becomes closer to the observers.

7. The display apparatus according to claim 1, further comprising a display object information acquiring unit configured to acquire display object information including information items on a size, a shape, and a position of the display object,
    wherein the display mode determining unit determines the display mode including the direction of the image to be displayed by the display unit in view of the display object information acquired by the display object information acquiring unit.

8. The display apparatus according to claim 7, wherein the display mode determining unit determines the direction of the image to be displayed by the display unit such that directions of the observers positioned to face a side of the display object on which a largest number of the observers are present substantially coincide with the direction of the image.

9. The display apparatus according to claim 8, wherein when the presence of another observer positioned to face a side adjacent to the side of the display object on which the largest number of observers are present is acquired by the observer information acquiring unit, the display mode determining unit determines the direction of the image to be displayed by the display unit such that the direction of the image becomes closer to the direction of the another observer positioned to face the adjacent side.

10. The display apparatus according to claim 7, wherein the display mode determining unit determines the display mode of the image to be displayed by the display unit by adjusting at least one of a display position, a display direction, and a display size of the image based on the display object information acquired by the display object information acquiring unit, such that the image does not extend outside of the display object.

11. The display apparatus according to claim 10, wherein the display mode determining unit determines the display mode to move or incline the image, or to enlarge or to reduce the display size of the image to be displayed by the display unit within such a range that the image does not extend outside of the display object based on the display object information acquired by the display object information acquiring unit.

12. The display apparatus according to claim 1, wherein the display control unit corrects the image signal input by the input unit to thereby cause the display unit to display the image in the display mode determined by the display mode determining unit.

13. The display apparatus according to claim 1, further comprising a registering unit configured to register a display mode corresponding to the number and the positions of the observers acquired by the observer information acquiring unit, wherein the display mode determining unit determines the display mode by reading a display mode corresponding to the number and the positions of the observers from the registering unit.

14. The display apparatus according to claim 1, further comprising an imaging unit configured to acquire an image of a range in which the display object and the observers are recognized to be positioned, wherein the observer information acquiring unit acquires the number and the positions of the observers facing the display object from the image acquired by the imaging unit.

15. The display apparatus according to claim 1, further comprising a seating detecting unit configured to detect a seating state of an observer relative to the display object, wherein the observer information acquiring unit acquires the number and the positions of the observers facing the display object from the seating state obtained by the seating detecting unit.

16. The display apparatus according to claim 1, further comprising a specifying unit configured to specify the number and the positions of the observers facing the display object, wherein the observer information acquiring unit acquires the number and the positions of the observers from contents specified by the specifying unit.

17. The display apparatus according to claim 1, wherein the display unit includes a projecting unit configured to project the image from a position above the display object toward a lower position.

18. The display apparatus according to claim 1, wherein the display unit includes an embedded display unit configured to display an image from inside of the display object toward outside of the display object.

19. A display control method for use in an apparatus including an input unit and a display unit configured to display an image based on an image signal input by the input unit on a display object, the method comprising:

performing observer information acquiring processing of acquiring a number and positions of observers facing the display object;

performing display mode determining processing of determining a display mode including a direction of the image to be displayed by the display unit based on the number and the positions of the observers acquired in the observer information acquiring processing; and performing display control processing of causing the display unit to display the image on the display object in the display mode determined in the display mode determining processing;

wherein performing the display mode determining processing comprises determining the display mode including the direction of the image such that the image is displayed by the display unit as a single image, when the number of the observers acquired in the observer information acquiring processing is one and when the number of the observers acquired in the observer information acquiring processing is more than one.

20. A non-transitory computer-readable storage medium having program code stored thereon for controlling a computer of an apparatus including an input unit and a display unit configured to display an image based on an image signal input by the input unit on a display object, the program code being executable to control the computer to perform functions comprising:

performing observer information acquiring processing of acquiring a number and positions of observers facing the display object;

performing display mode determining processing of determining a display mode including a direction of the image to be displayed by the display unit based on the number and the positions of the observers acquired in the observer information acquiring processing; and performing display control processing of causing the display unit to display the image on the display object in the display mode determined in the display mode determining processing;

wherein performing the display mode determining processing comprises determining the display mode including the direction of the image such that the image is displayed by the display unit as a single image, when the number of the observers acquired in the observer information acquiring processing is one and when the number of the observers acquired in the observer information acquiring processing is more than one.

* * * * *